United States Patent [19]

Kumagai et al.

[11] Patent Number: 4,686,166
[45] Date of Patent: Aug. 11, 1987

[54] ELECTROPHOTO TONER COMPRISING IMIDO GROUP MONOMER UNIT IN POLYMER

[75] Inventors: Yuugo Kumagai; Isamu Moribe; Takayuki Saito; Toshiyuki Fujita, all of Hitachi; Akihiro Kobayashi, Ichihara, all of Japan

[73] Assignee: Hitachi Chemical Co., Tokyo, Japan

[21] Appl. No.: 915,492

[22] Filed: Oct. 6, 1986

[30] Foreign Application Priority Data

Oct. 7, 1985 [JP] Japan ................................. 60-223326
Oct. 7, 1985 [JP] Japan ................................. 60-223327
Jun. 13, 1986 [JP] Japan ................................. 61-138723
Jul. 1, 1986 [JP] Japan ................................. 61-154648

[51] Int. Cl.$^4$ ............................................. G03G 9/08
[52] U.S. Cl. ..................................... 430/109; 430/904; 430/110
[58] Field of Search ........................ 430/109, 110, 904

[56] References Cited

U.S. PATENT DOCUMENTS 4,628,019 12/1986 Suematsu et al. ............ 430/109 X

Primary Examiner—J. David Welsh
Attorney, Agent, or Firm—Antonelli, Terry & Wands

[57] ABSTRACT

A toner for developing latent electrostatic images comprising a copolymer having as an essential component a monomer unit derived from an imido group-containing unsaturated monomer of the formula:

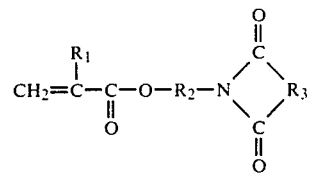

wherein $R_1$, $R_2$ and $R_3$ are as defined in the specification, has excellent properties such as resistance to adhesion to plasticized polyvinyl chloride, high image density, resistance to fogging, etc.

6 Claims, No Drawings

ELECTROPHOTO TONER COMPRISING IMIDO GROUP MONOMER UNIT IN POLYMER

BACKGROUND OF THE INVENTION

This invention relates to a toner for developing latent electrostatic images used in the fields of electrophotography, electrostatic recording, and the like.

In the electrophotography and electrostatic recording, a printed or copied image can be produced, for example, by steps of forming a latent electrostatic image on a photoconductive material by a various kind of means, developing the electrostatic image with toner particles, transferring the toner which formed the image to a transferring material such as paper, Mylar film, etc., and fixing with heated rolls, pressure rolls, heated pressure rolls, or a flash light from a xenon lamp.

As toners for developing latent electrostatic images usable in the electrophotography and electrostatic recording, there have been known toners using vinyl resins as a binder such as a toner using a polystyrene resin (Japanese Patent Examined Publication No. 44-16118), a toner using a styrene-butyl methacrylate copolymer resin (Japanese Patent Examined Publication No. 56-11143), etc., a toner using a bisphenol type epoxy resin obtained by reacting a bisphenol with epichlorohydrin (Japanese Patent Unexamined Publication No. 57-96354), a toner using a polyester resin obtained by reacting a glycol having a bisphenol skeleton with a polybasic acid (U.S. Pat. No. 3,681,106) and the like. Since the vinyl resins can be controlled in wide range regarding physical properties such as molecular weight, glass transition point, melt viscosity, etc., and are very advantageous for designing toners, almost toners are obtained by using these vinyl resins.

In order to make these toners have a desirable negative charge, there are proposed processes for adding substances for imparting a negative charge to binder resins (hereinafter referred to as "negatively charging substance"), for example, a metal complex of azo compound, silica fine powder, etc. (Japanese Patent Unexamined Publication Nos. 57-130049, 57-136659, U.S. Pat. No. 4,518,673 and British Patent Laid-Open No. 2,114,310).

In order to make these toners have a desirable positive charge, there are proposed processes for adding substances for imparting a positive charge to binder resins (hereinafter referred to as "positively charging substance"), for example, nigrosine dyes (Japanese Patent Examined Publication No. 59-11901), triphenylmethane series dyes, benzoguanamine resins (Japanese Patent Unexamined Publication No. 58-192048), quaternary ammonium salts (U.S. Pat. No. 4,394,430), and processes for making the binder resins per se have a positive charge by copolymerization with positive charge imparting monomers such as vinyl pyridine (British Patent No. 1,482,905), morpholinoethyl methacrylate (Japanese Patent Unexamined Publication No. 54-41729), dialkylamioalkyl (meth)acrylates (Japanese Patent Examined Publication No. 41-9472), etc.

On the other hand, printed or copied products are sometimes stored in files containing sheets of plasticized polyvinyl chloride in order to prevent stain and damage and to use for a long period of time. But the hereto known toners using vinyl resins have a fatal defect in that when printed or copied products obtained by using such toners are stored in contact with sheets of plasticized polyvinyl chloride, the printed or copied letters and images are adhered to the sheets to produce defects of printed or copied letters and images and to make it impossible to read the letters and images.

SUMMARY OF THE INVENTION

It is an object of this invention to provide a toner for developing electrostatic images overcoming disadvantages of prior art toners.

This invention provides a toner for developing latent electrostatic images comprising as a binder polymer a polymer having as an essential component a monomer unit derived from an imido group-containing unsaturated monomer represented by the formula:

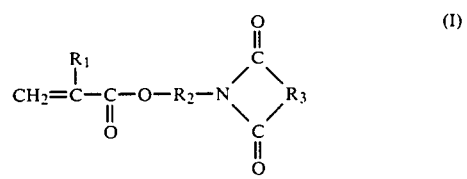

wherein $R_1$ is hydrogen or a methyl group; $R_2$ is an alkylene group having 1 to 6 carbon atoms or a divalent organic group having an alicyclic or aromatic ring; and $R_3$ is a group represented by the formula:

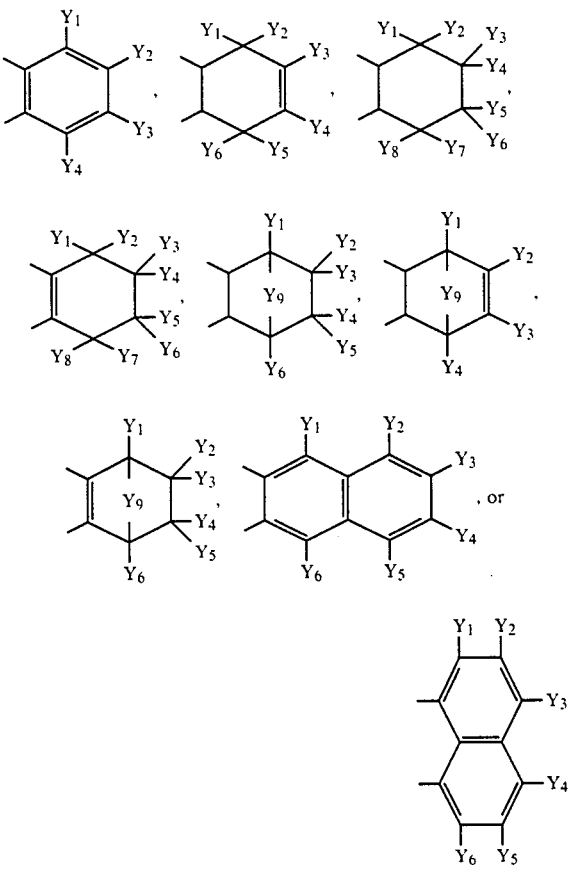

wherein $Y_1$, $Y_2$, $Y_3$, $Y_4$, $Y_5$, $Y_6$, $Y_7$ and $Y_8$ are independently hydrogen, an alkyl group having 1 to 3 carbon atoms, a halogen

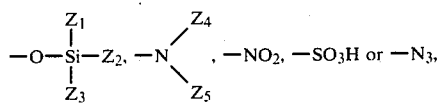

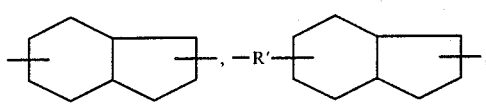

5 in which $Z_1$, $Z_2$, $Z_3$, $Z_4$ and $Z_5$ are independently hydrogen of an alkyl group having 1 to 5 carbon atoms; and $Y_9$ is

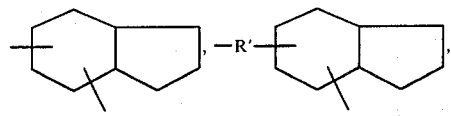

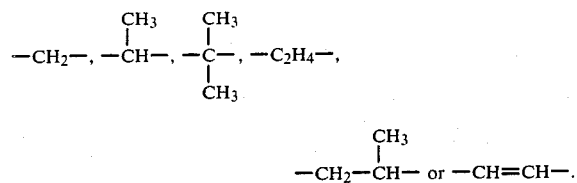

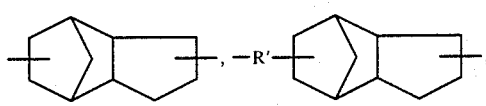

DESCRIPTION OF THE PREFERRED EMBODIMENTS

The toner of this invention has excellent properties such as toners or toners fixed to a transferring material being not adhered to plasticized polyvinyl chloride, and high image density and resistance to fogging necessary as the toner being obtained. Further, the toner of this invention can solve the following problems caused in the production of prior art positively charging toners or negatively charging toners by mixing charge imparting substances with binder resins:

(1) Since the charge imparting substances are poor in compatibility with the binder resins and do not disperse uniformly, the charge of individual toner particles distributes in a wide range from positive to negative and fogging easily takes placed in fixed images.

(2) Since the charge imparting substances are not mixed well with the binder resins, the charge imparting substances adhere to the surface of carrier or photoconductive plate to cause a filming phenomenon, changes in printed or copied letter density, fogging and lowering in resolution.

(3) Since the charge imparting substances are usually colored, they are not suitable for color toners.

Further, the toner of this invention is also improved in moisture resistance and fixing properties.

As to the monomer of the formula (I), the divalent organic group having an alicyclic or aromatic ring in the definition of $R_2$ includes the following groups:

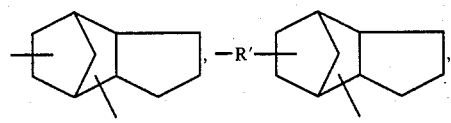

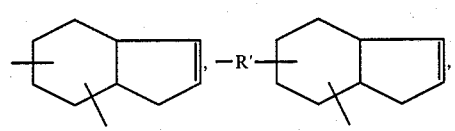

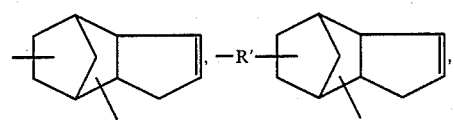

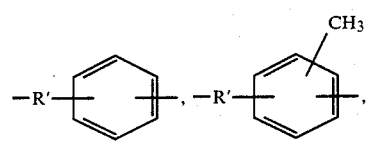

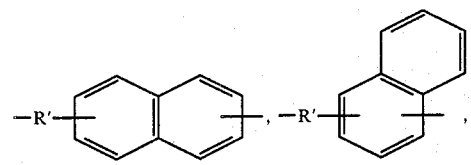

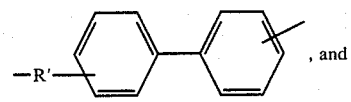

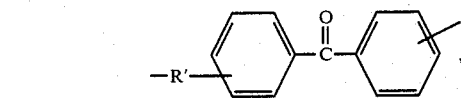

wherein R' is an alkylene group having 1 to 6 carbon atoms, $—C_{1-6}$ alkylene—O—, or $—C_{1-6}$ alkylene—O—$C_{1-6}$ alkylene—.

Examples of the imido group-containing unsaturated monomer of the formula (I) are as follows.

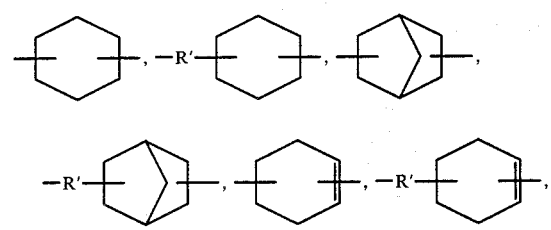

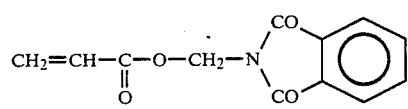

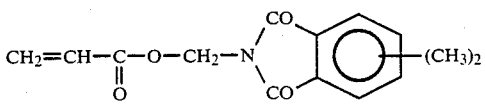

-continued
(Monomer 4)
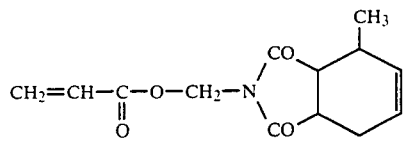
(Monomer 10)
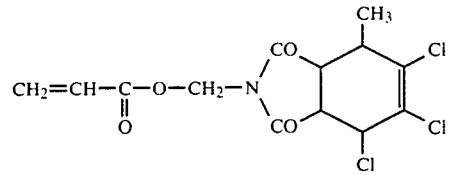
(Monomer 19)
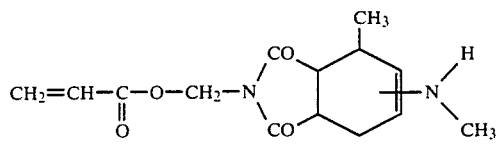
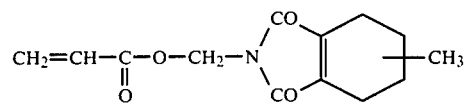
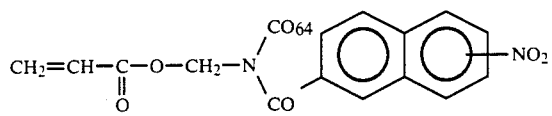
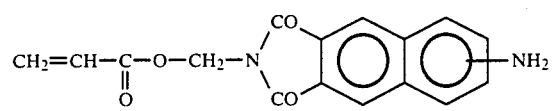
(Monomer 38)
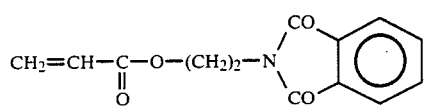
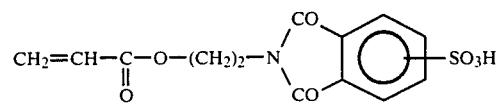
(Monomer 2)
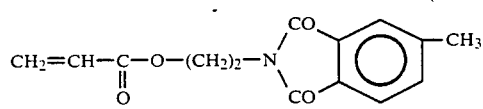
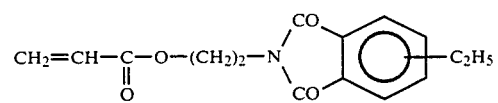
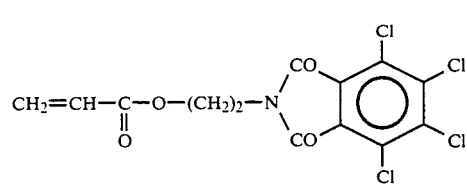
(Monomer 8)
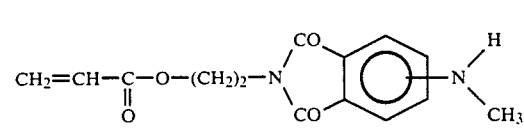
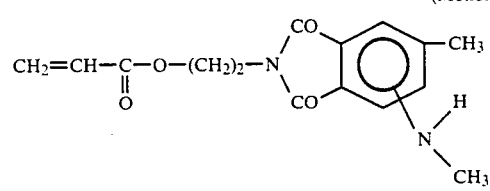
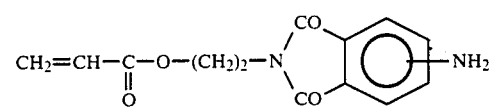
(Monomer 17)
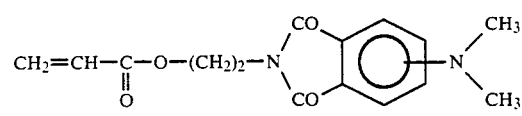
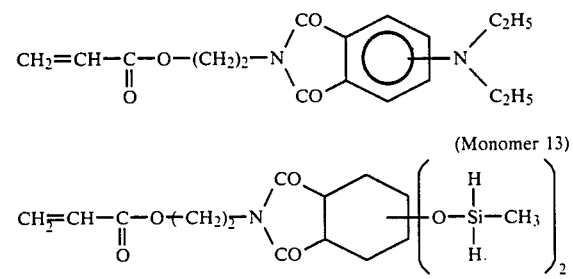
(Monomer 7)
(Monomer 13)

-continued
(Monomer 22)
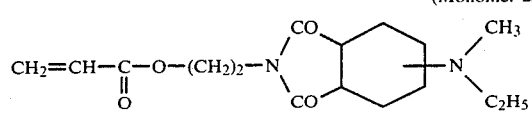 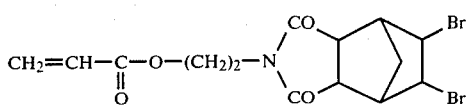
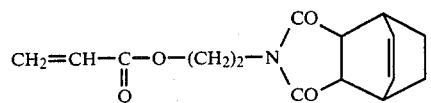 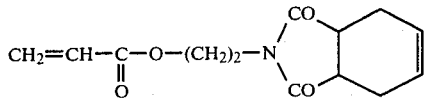
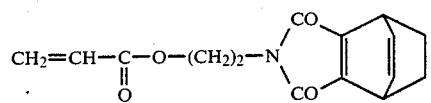 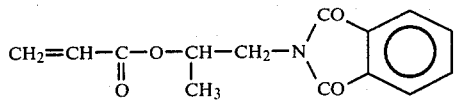
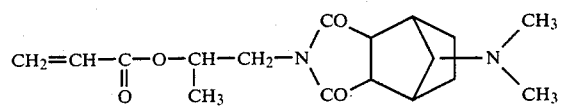 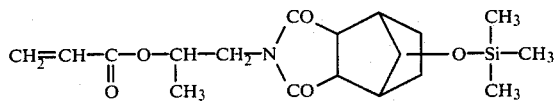
(Monomer 6)
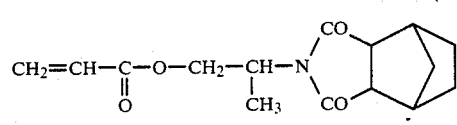 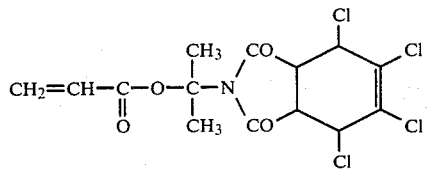
(Monomer 5)
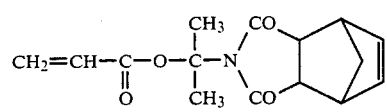 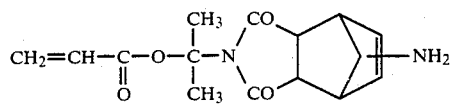
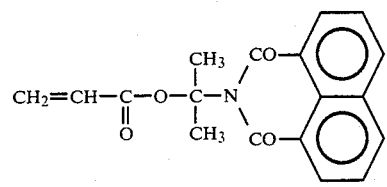 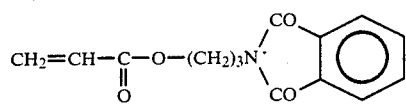
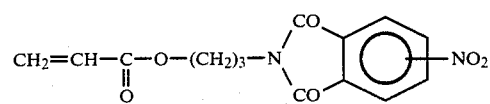 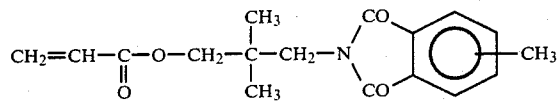
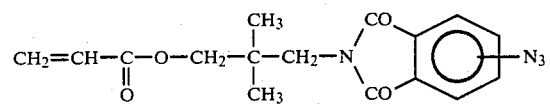 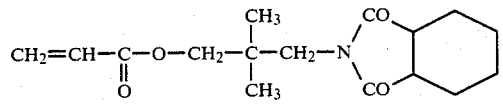
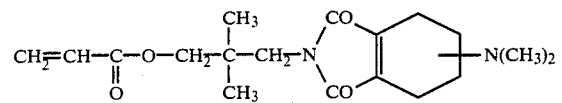 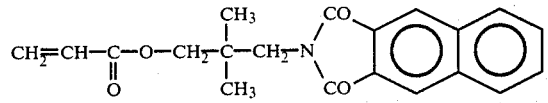
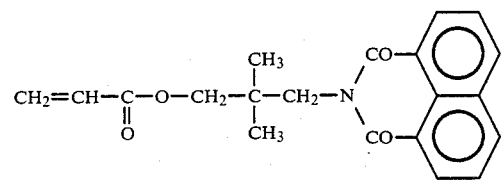 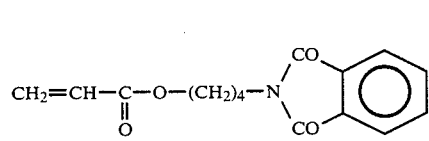

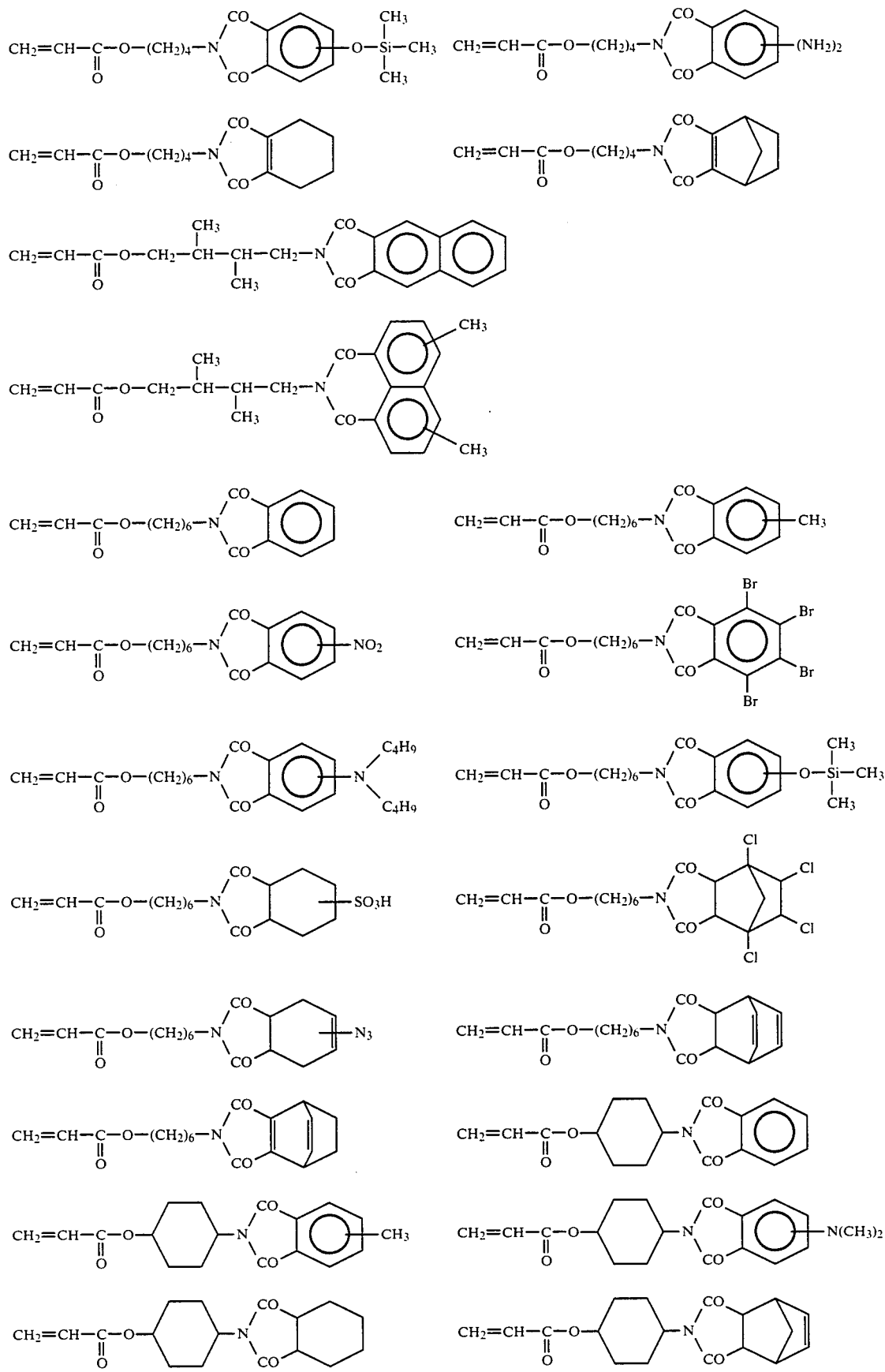

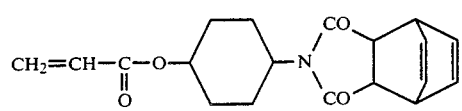
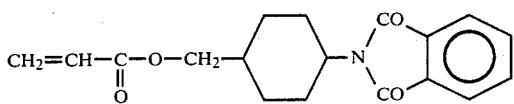
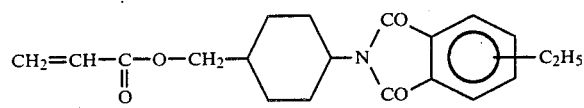
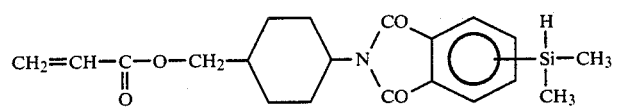
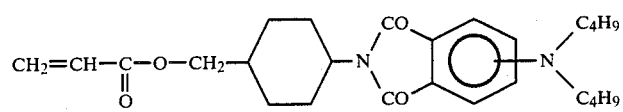
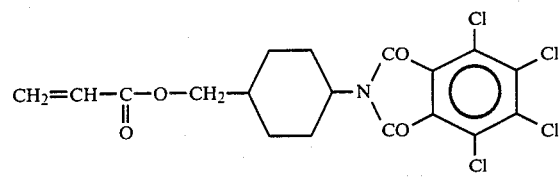
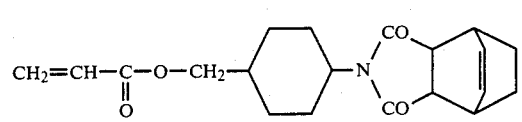
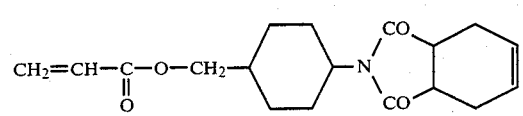
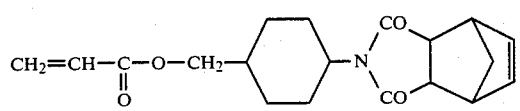
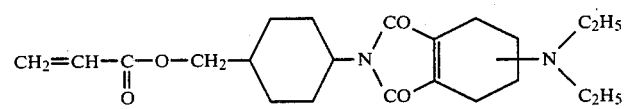
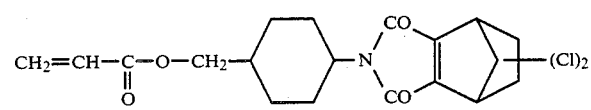
(Monomer 39)
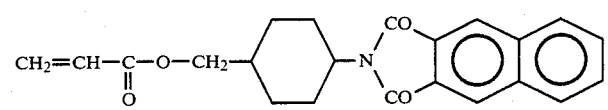
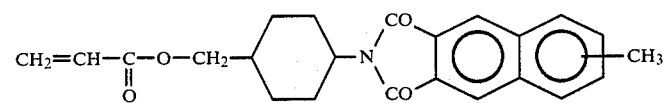
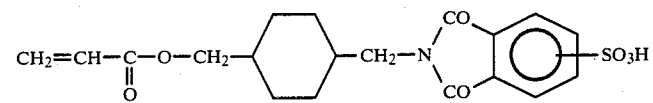
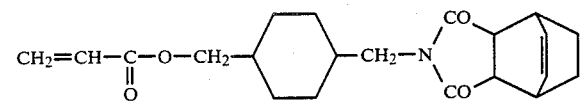
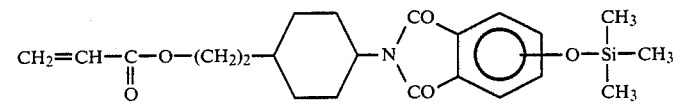

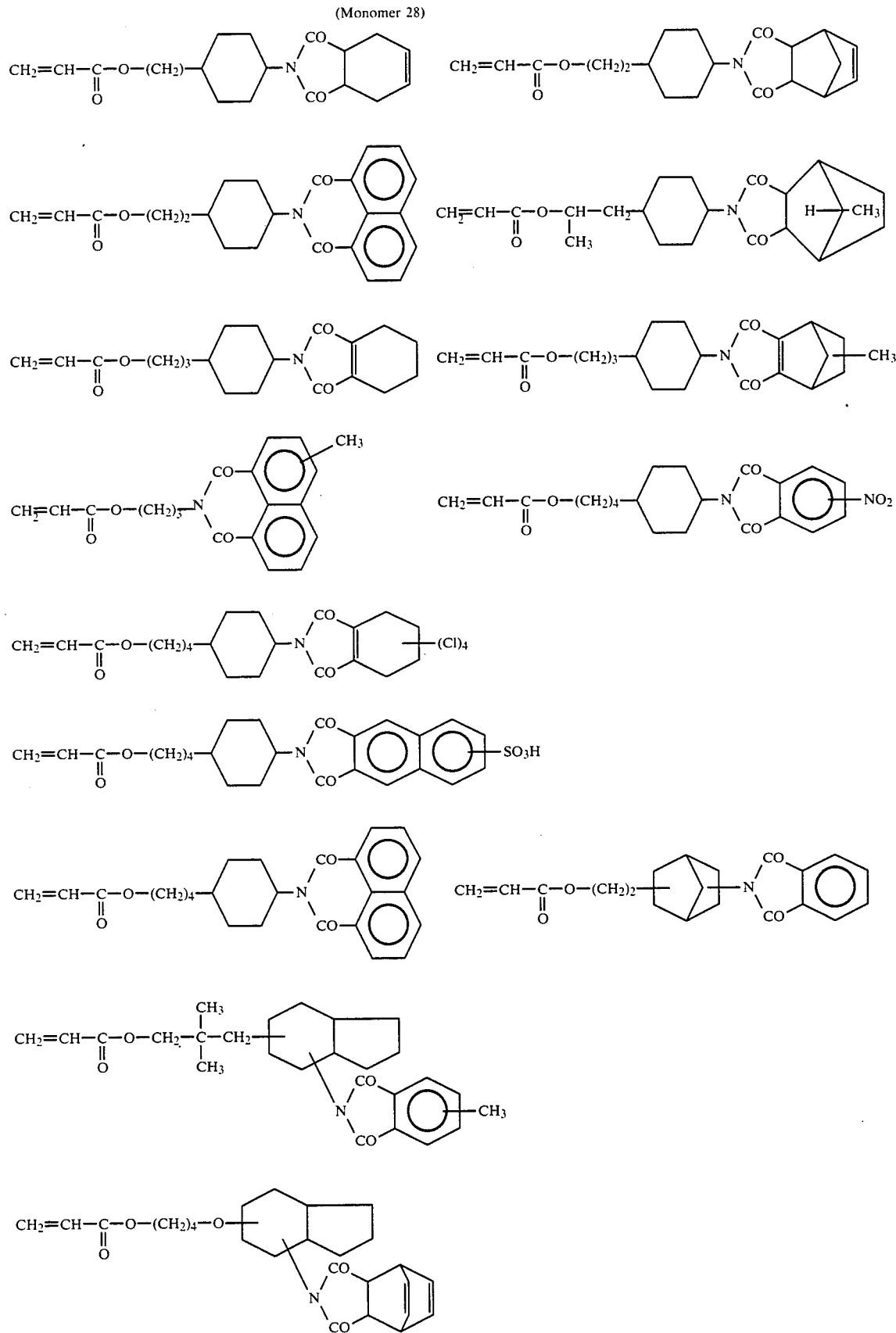

-continued
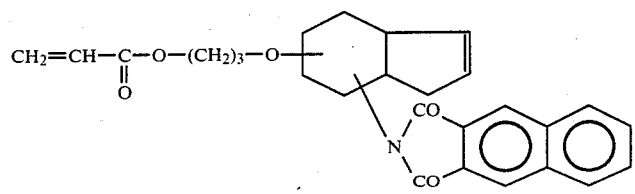
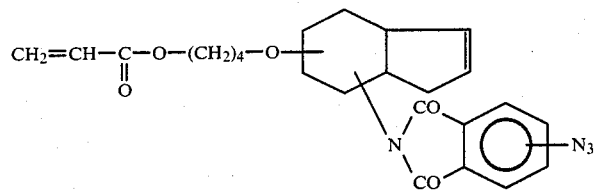
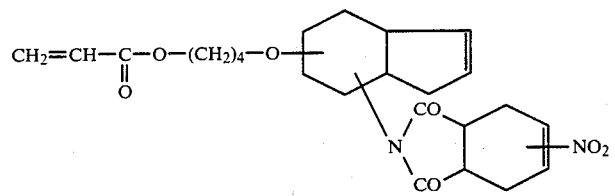
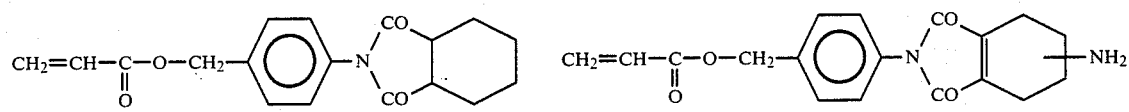
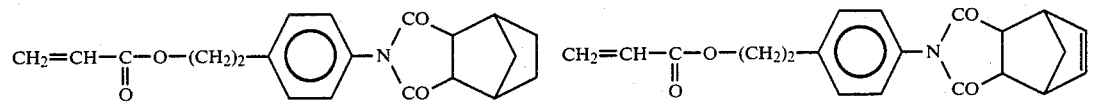
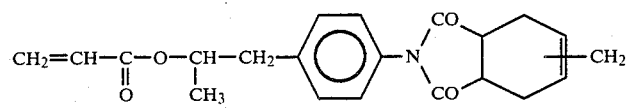
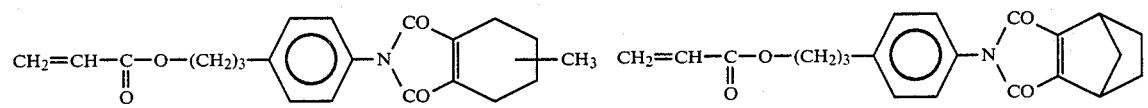
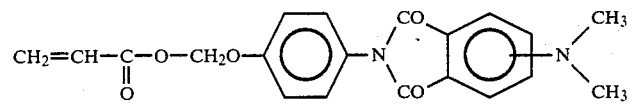
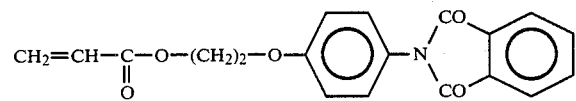
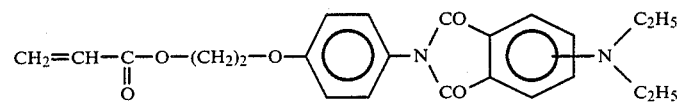

-continued
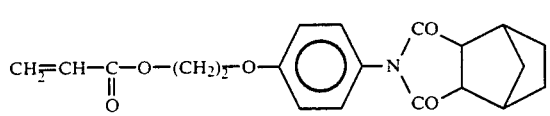
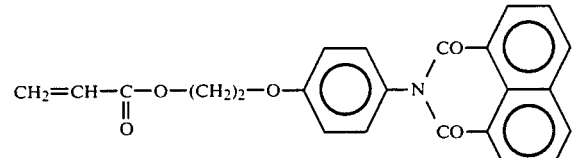
(Monomer 33)
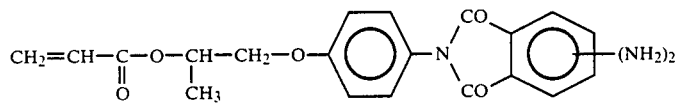
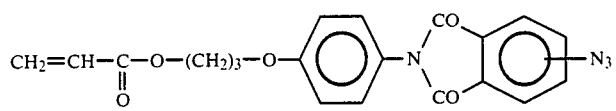
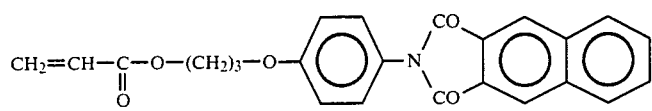
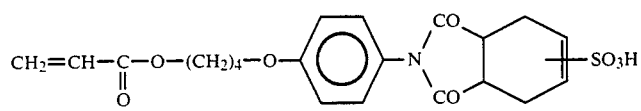
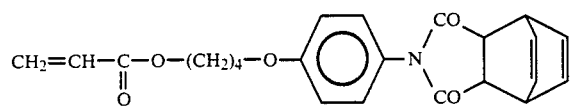
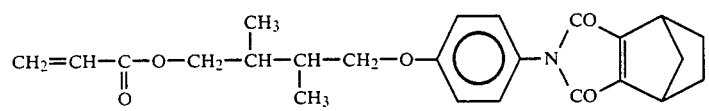
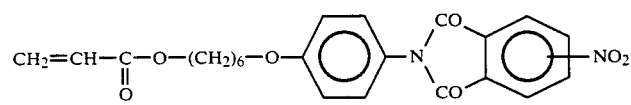
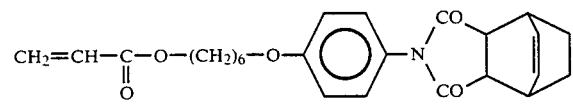
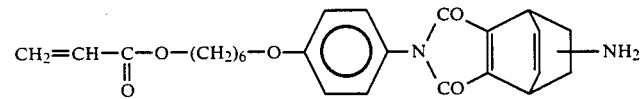
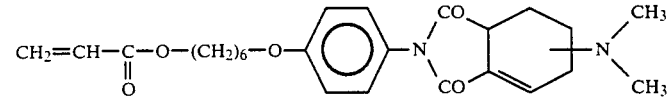
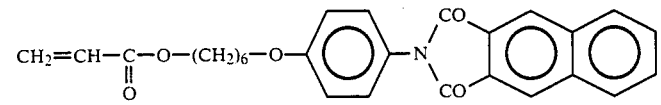

-continued
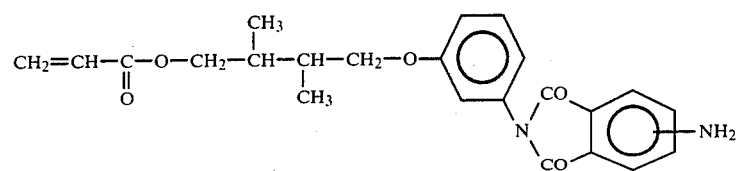
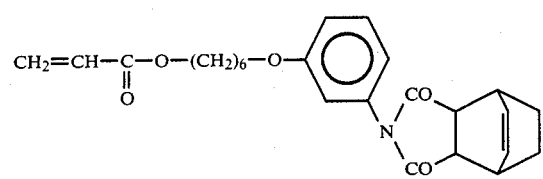
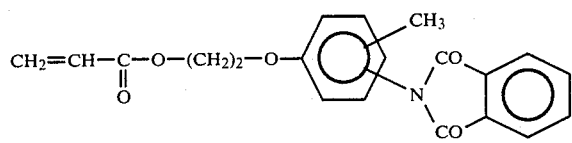
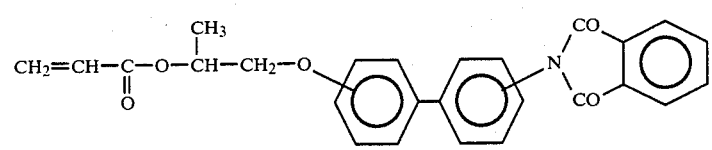
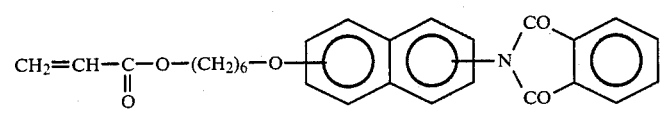
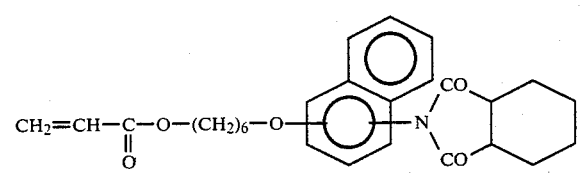
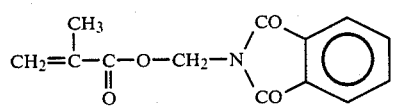
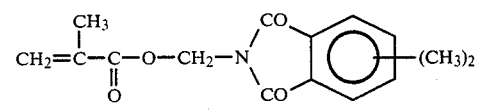
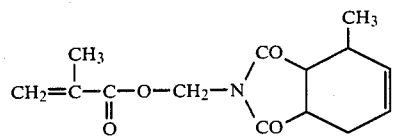
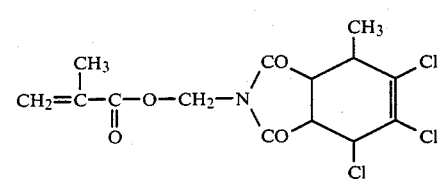
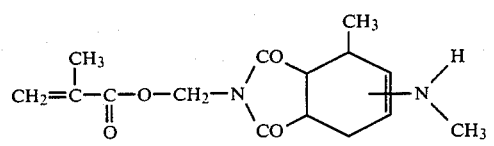
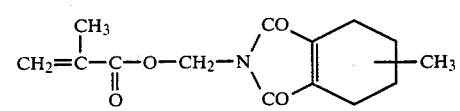
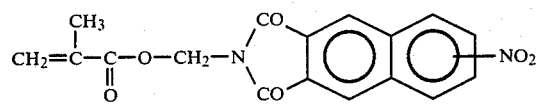
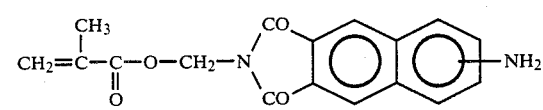
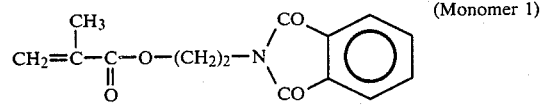
(Monomer 1)
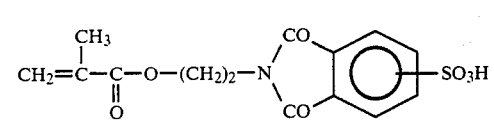
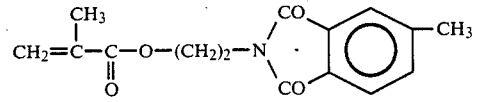

-continued
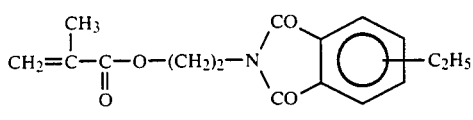
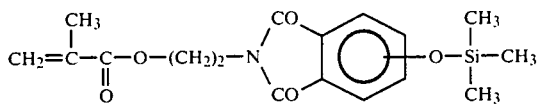
(Monomer 9)
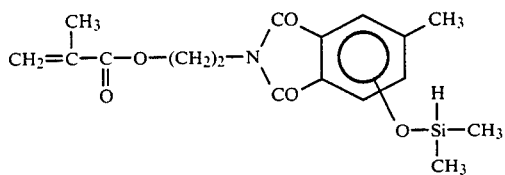
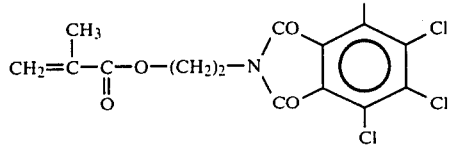
(Monomer 3)
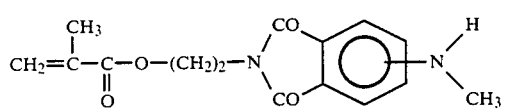
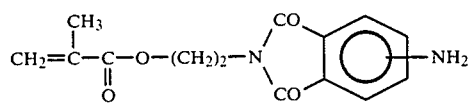
(Monomer 16)
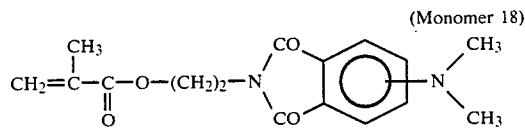
(Monomer 18)
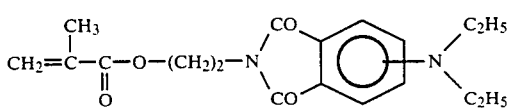
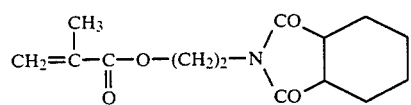
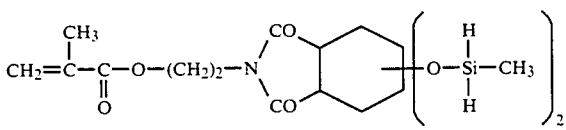
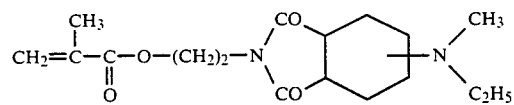
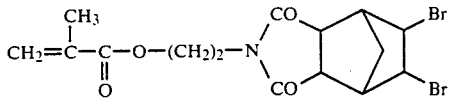
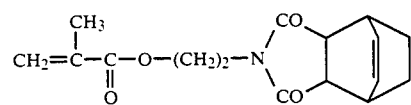
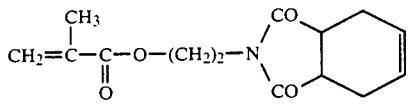
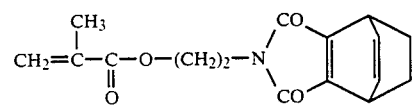
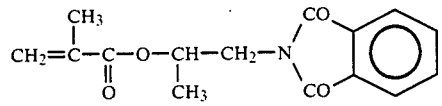
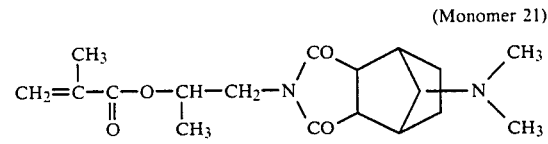
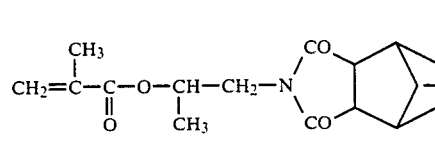
(Monomer 37)
(Monomer 21)
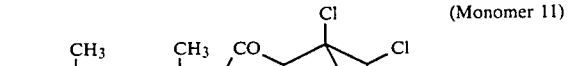
(Monomer 12)
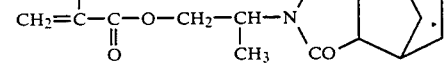
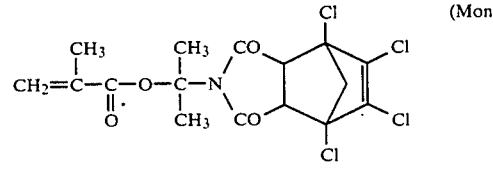
(Monomer 11)
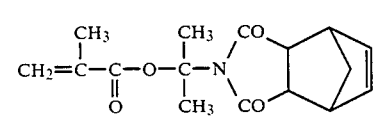
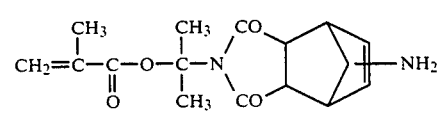
(Monomer 20)

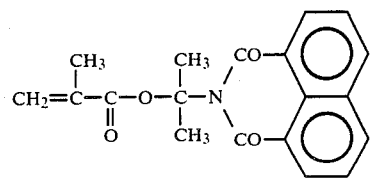
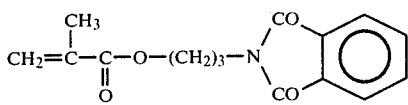
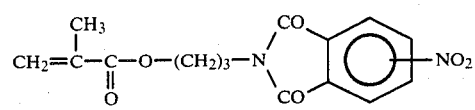
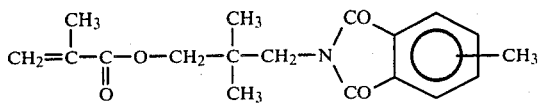
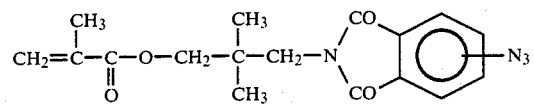
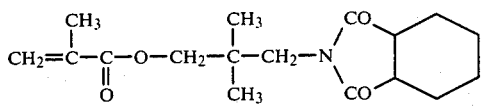
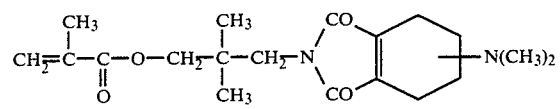
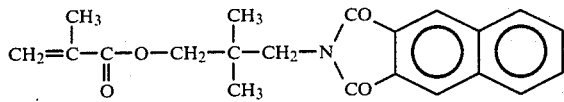
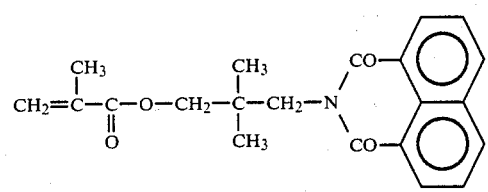
(Monomer 14)
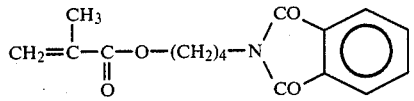
(Monomer 23)
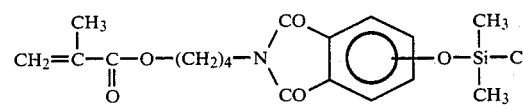
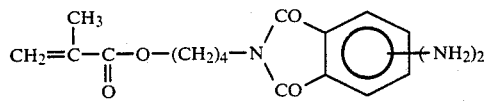
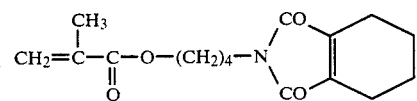
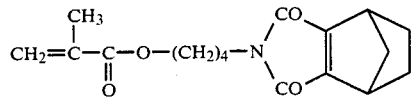
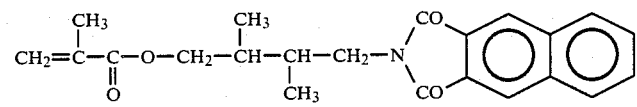
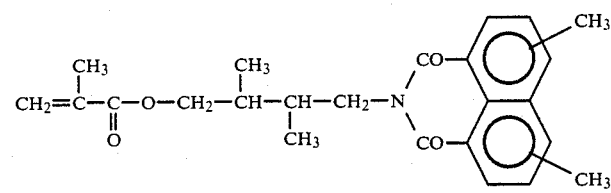
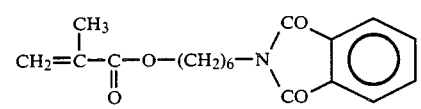
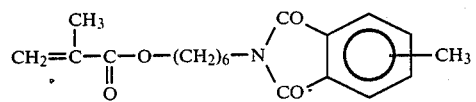
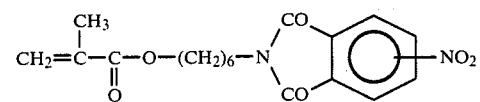
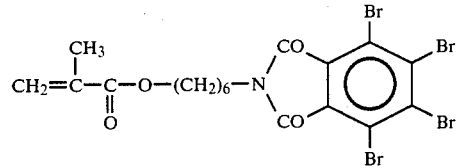

-continued
(Monomer 24)
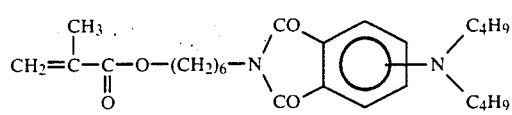
(Monomer 15)
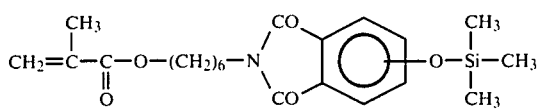
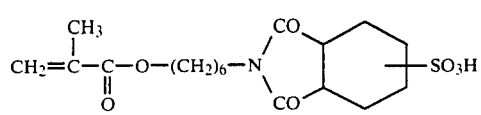
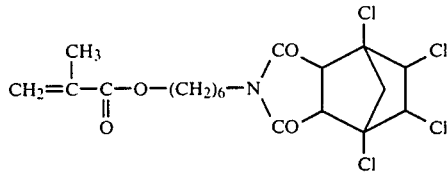
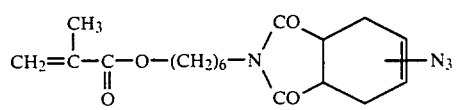
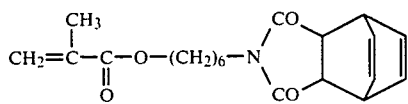
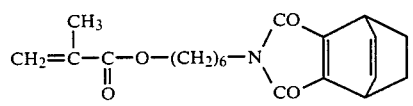
(Monomer 25)
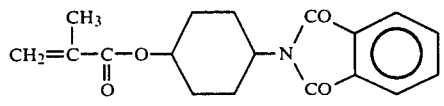
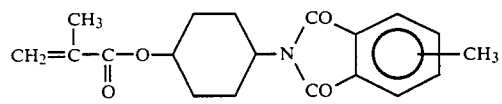
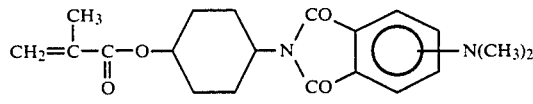
(Monomer 31)
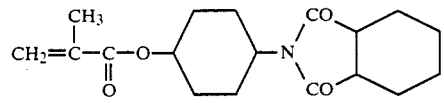
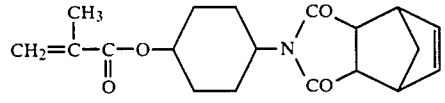
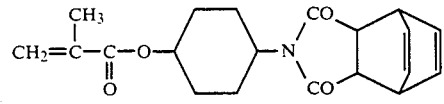
(Monomer 26)
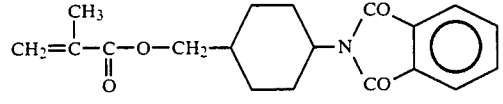
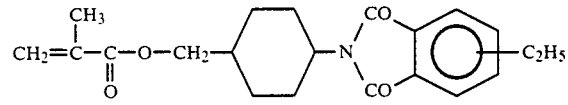
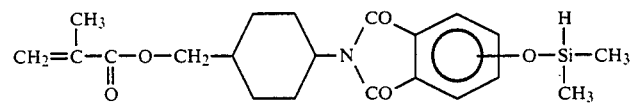
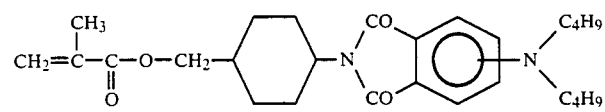
(Monomer 34)
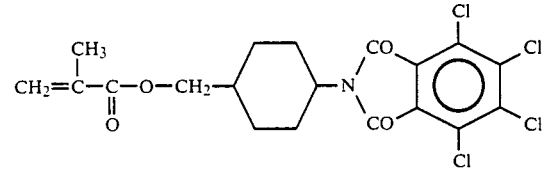
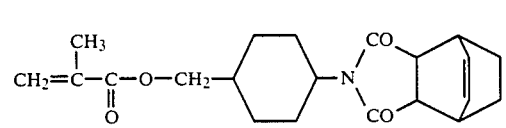

-continued
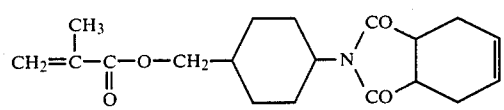
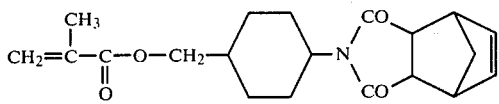
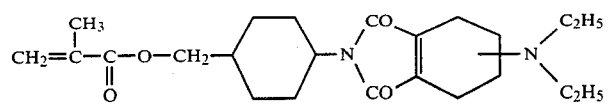
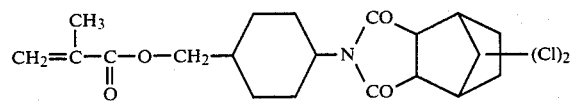
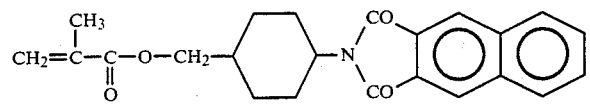
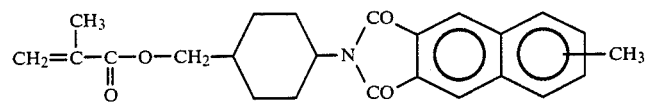
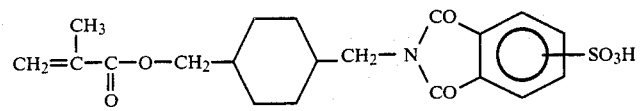
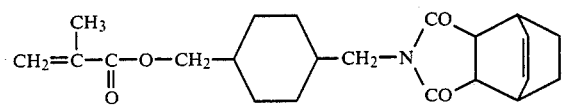
(Monomer 35)
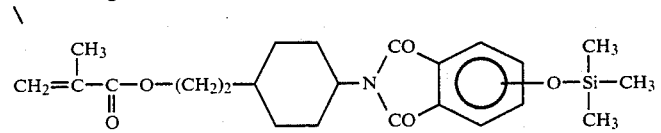
(Monomer 29)
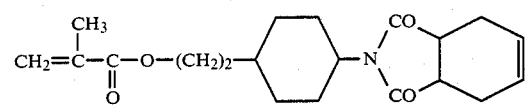
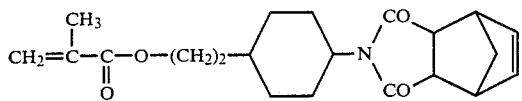
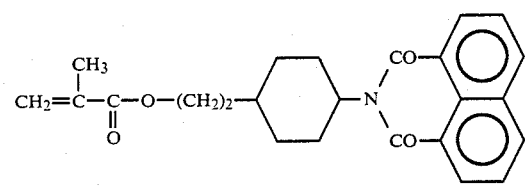
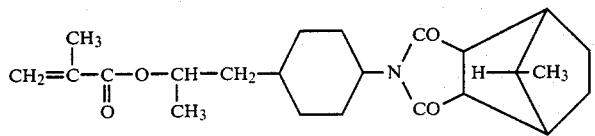
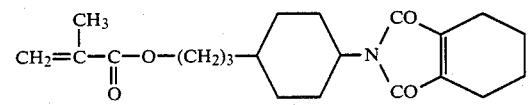
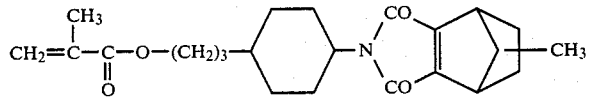
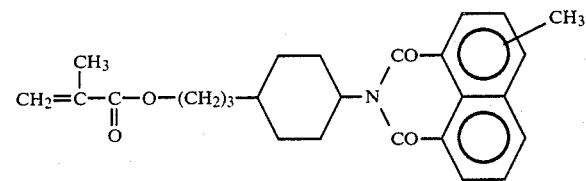

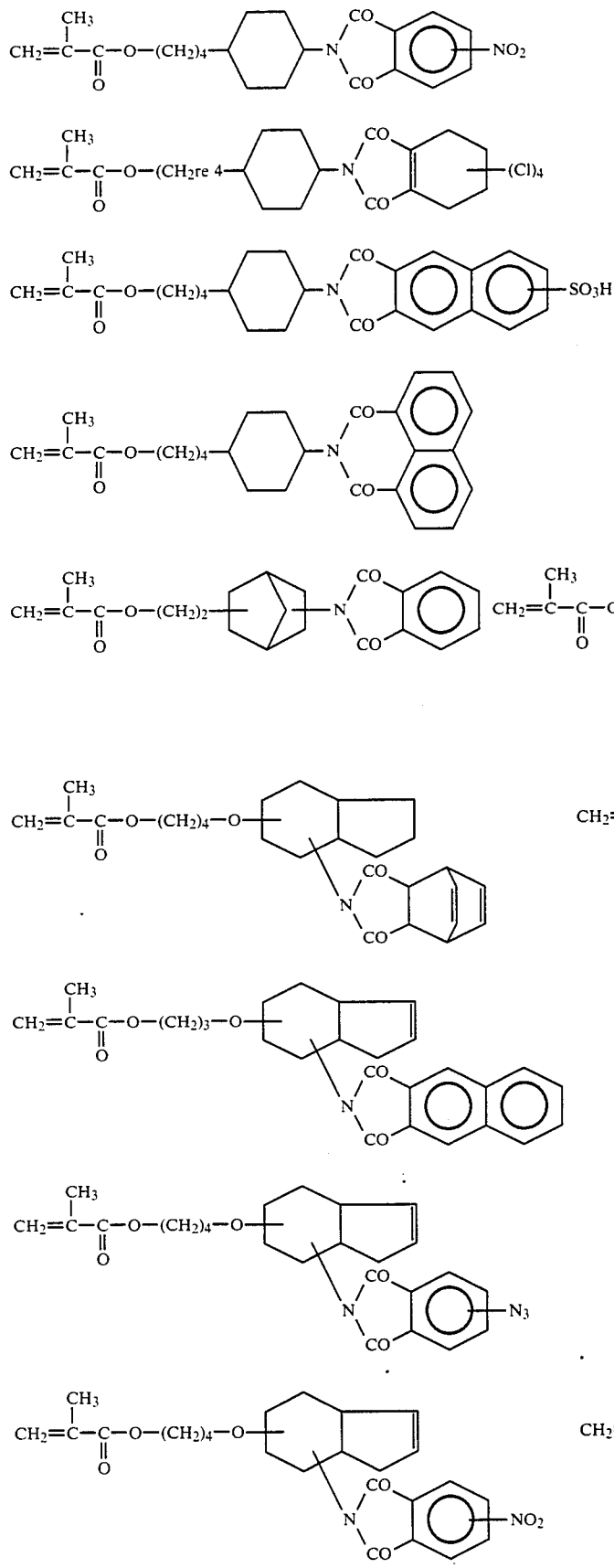

-continued
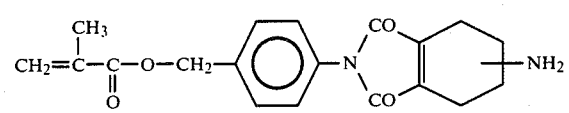
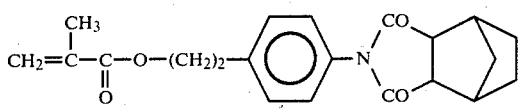
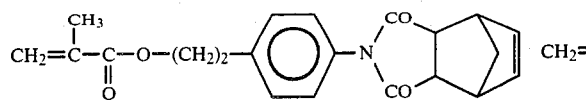
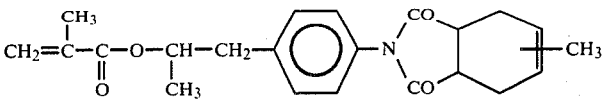
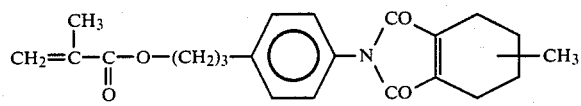
(Monomer 36)
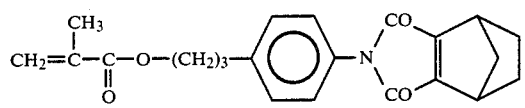
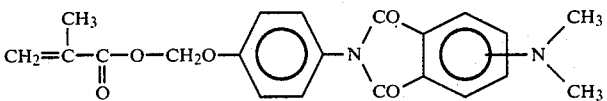
(Monomer 27)
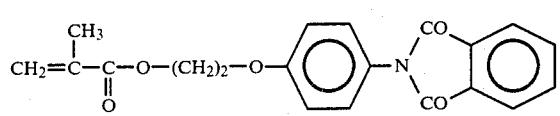
(Monomer 30)
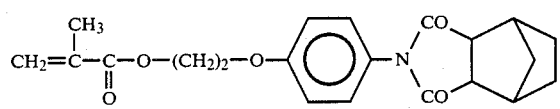
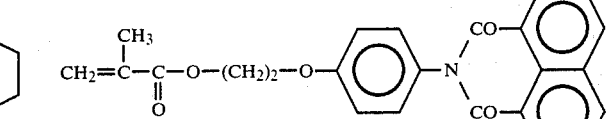
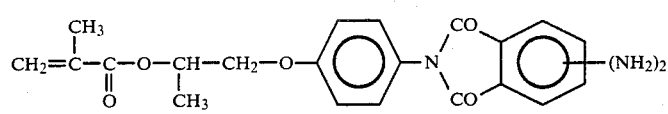
(Monomer 32)
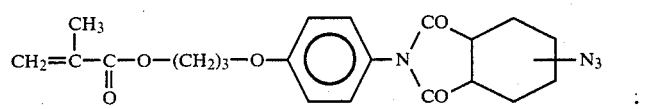
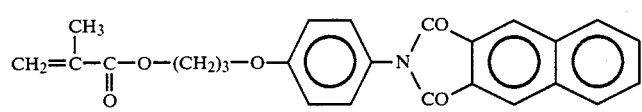
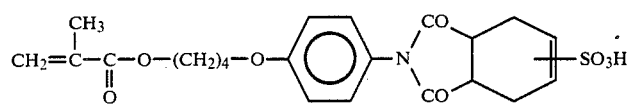

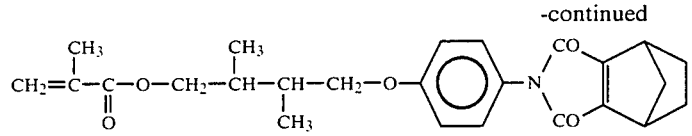
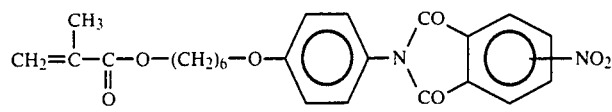
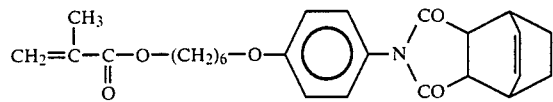
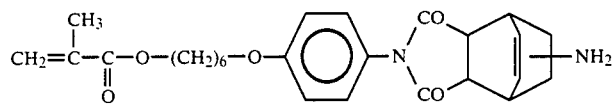
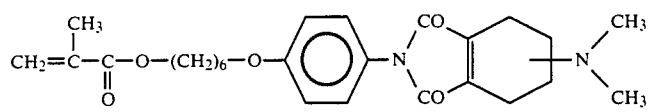
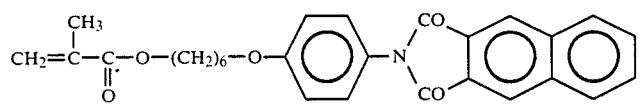
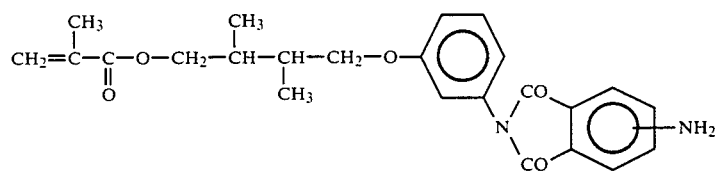
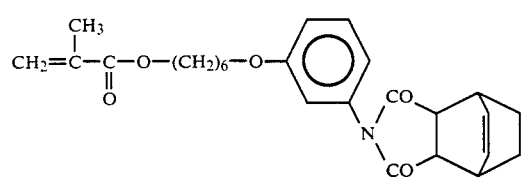
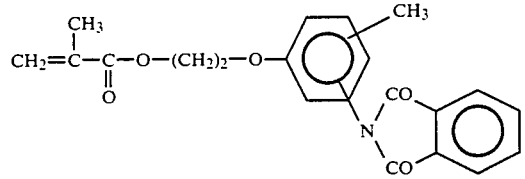
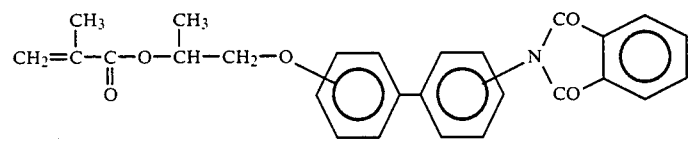
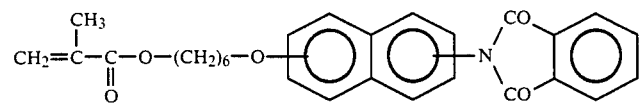
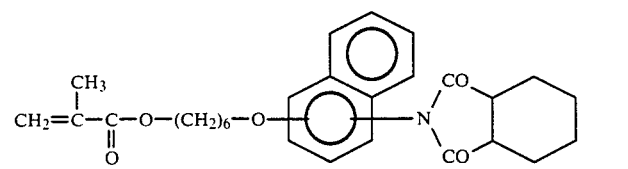
The polymer used as a binder in the toner for developing latent electrostatic images should have as an essential component a monomer unit derived from the imido group-containing polymerizable unsaturated monomer of the formula (I) (hereinafter referred to as "monomer of the formula (I)"). Concrete construction of the binder polymer is as follows:

(A) A homopolymer of a monomer of the formula (I) and/or a copolymer of two or more different kinds of monomers of the formula (I).

(B) A copolymer of a monomer of the formula (I) and at least one other polymerizable unsaturated monomer.

(C) A blend of at least one homopolymer or copolymer of (A) and at least one copolymer of (B).

(D) A blend of at least one homopolymer or copolymer of (A) and/or at least one copolymer of (B) with at least one other resin.

The content of the monomer of the formula (I) as a monomer unit in the binder polymer is preferably 5 to 100% by weight, more preferably 10 to 90% by weight, most preferably 20 to 80% by weight, particularly most preferably 25 to 60% by weight. If the content is too small, resistance to adhesion of the toner to plasticized polyvinyl chloride sheets becomes insufficient, whereas if the content is too much, there is a tendency to make properties of the toner insufficient. Therefore, the content of 90% by weight or less is preferable.

The monomer of the formula (I) can be produced, for example, by reacting a corresponding acid anhydride with an amino alcohol for carrying out an imidization reaction, and adding acrylic acid or methacrylic acid or a lower alkyl ester thereof for carrying out an esterification reaction or ester exchange reaction.

When the monomer of the formula (I) has at least one halogen,

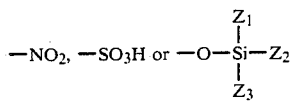

(wherein $Z_1$, $Z_2$ and $Z_3$ are as defined above) as $R_3$, the polymer having such a monomer unit as a major resin component can make the toner have a negative charge without using a negative charging substance.

On the other hand, when the monomer of the formula (I) has at least one

(wherein $Z_4$ and $Z_5$ are as defined above) as $R_3$, the polymer having such a monomer unit as a major resin component can make the toner have a positive charge without using a positive charging substance.

Examples of other polymerizable unsaturated monomers copolymerizable with the monomer of the formula (I) are as follows:

(a) Styrene, α-methylstyrene, p-methylstyrene, p-t-butylstyrene, p-chlorostyrene, and the like styrene derivatives.

(b) Methacrylic acid, methyl methacrylate, ethyl methacrylate, propyl methacrylate, butyl methacrylate, pentyl methacrylate, hexyl methacrylate, heptyl methacrylate, octyl methacrylate, nonyl methacrylate, decyl methacrylate, undecyl methacrylate, dodecyl methacrylate, glycidyl methacrylate, methoxyethyl methacrylate, propoxyethyl methacrylate, butoxyethyl methacrylate, methoxy diethylene glycol metthacrylate, ethoxy diethylene glycol methacrylate, methoxy ethylene glycol methacrylate, butoxy triethylene glycol methacrylate, methoxy dipropylene glycol methacrylate, phenoxyethyl methacrylate, phenoxy tetraethylene glycol methacrylate, benzyl methacrylate, cyclohexyl methacrylate, tetrahydrofurfuryl methacrylate, dicyclopentenyl methacrylate, dicyclopentenyloxyethyl methacrylate, N-vinyl-2-pyrrolidone methacrylate, methacrylonitrile, methacrylamide, N-methylolmethacrylamide, 2-hydroxyethyl methacrylate, hydroxypropyl methacrylate, hydroxybutyl metthacrylate, 2-hydroxy-3-phenyloxypropyl methacrylate.

(c) Diacetone acrylamide, acrylic acid, methyl acrylate, ethyle acrylate, propyl acrylate, butyl acrylate, pentyl acrylate, hexyl acrylate, heptyl acrylate, octyl acrylate, nonyl acrylate, decyl acrylate, undecyl acrylate, dodecyl acrylate, glycidyl acrylate, methoxyethyl acrylate, propoxyethyl acrylate, butoxyethyl acrylate, methoxy diethylene glycol acrylate, ethoxy diethylene glycol acrylate, methoxy ethylene glycol acrylate, butoxy triethylene glycol acrylate, methoxy dipropylene glycol acrylate, phenoxyethyl acrylate, phenoxy diethylene glycol acrylate, phenoxy tetraethylene glycol acrylate, benzyl acrylate, cyclohexyl acrylate, tetrahydrofurfuryl acrylate, dicyclopentenyl acrylate, dicyclopentenyloxy ethyl acrylate, N-vinyl-2-pyrrolidone acrylate, hydroxyethyl acrylate, hydroxypropyl acrylate, hydroxybutyl acrylate, 2-hydroxy-3-phenyloxypropyl acrylate, glycidyl acrylate, acrylonitrile, acrylamide, N-methylol acrylamide, diacetone acrylamide, vinylpyridine.

(d) Compounds represented by the formula:

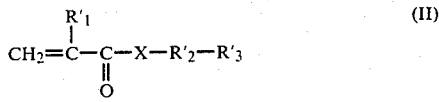

wherein $R'_1$ is hydrogen or a methyl group; X is —O—,

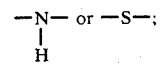

$R'_2$ is $C_nH_{2n}$ (in which n is an integer of 1 to 20); and $R'_3$ is

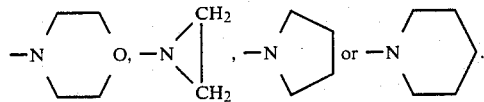

Concrete examples of the compounds of the formula (II) are as follows:

Morpholinoalkyl acrylates such as morpholinomethyl acrylate, morpholinoethyl acrylate, 2-morpholinopropyl acrylate, 3-morpholinopropyl acrylate, 4-morpholinopropyl acrylate, 4-morpholinobutyl acrylate, 3-morpholinobutyl acrylate, 2-morpholinobutyl acrylate, 2-morpholinopentyl acrylate, 2-morpholinohexyl acrylate, 2-morpholinooctyl acrylate, etc.; morpholinoalkyl methacrylates having the same morpholinoalkyl groups as mentioned above; substituted alkyl acrylates having an aziridyl group, piperadyl group or piperidyl group in place of the morpholino group, i.e. aziridylalkyl acrylates, piperadylalkyl acrylates, and piperidylalkyl acrylates; aziridylalkyl methacrylates, piperadylalkyl methacrylates and piperidylalkyl methacrylates having the same alkyl groups as mentioned above; morpholinoalkyl acrylamides such as morpholinomethyl acrylamide, morpholinoethyl acrylamide, 3-morpholinopropyl acylamide, 2-morpholinopropyl acrylamide, 4-morpholinobutyl acrylamide, 3-morpholinobutyl acrylamide, 2-morpholinobutyl acrylamide, 2-morpholinopentyl acrylamide, 2-morpholinohexyl acrylamide, 2-morpholinooctyl acrylamide; morpholinoalkyl methacrylamides having the same morpholinoalkyl groups as mentioned above; substituted alkyl acrylamides having an aziridyl group, piperadyl group or piperidyl group in place of the morpholino group, i.e. aziridylalkyl acrylamides, piperadylalkyl acrylamides, and piperidylalkyl acrylamides; aziridylalkyl methacrylamides, piperadylalkyl methacrylamides and piperidylalkyl methacrylamides having the same alkyl groups as mentioned above; morpholinoalkyl thioacrylates such as morpholinomethyl thioacrylate, morpholinoethyl thioacrylate, 3-morpholinopropyl thioacrylate, 2-morpholinopropyl thioacrylate, 4-morpholinobutyl thioacrylate, 3-morpholinobutyl thioacrylate, 2-morpholinobutyl thioacrylate, 2-morpholinopentyl thioacrylate, 2-morpholinohexyl thioacrylate, 2-morpholinooctyl thioacrylate, etc.; morpholinoalkyl thiomethacrylates having the same morpholinoalkyl groups as mentioned above; substituted alkyl thioacrylates having an aziridyl group, piperadyl group or piperidyl group in place of the morpholino group, i.e., aziridylalkyl thioacrylates, piperadylalkyl thioalrylates, and piperidylalkyl thioacrylates; aziridylalkyl thiomethacrylates, piperadylalkyl thiomethacrylates and piperidylalkyl thiomethacrylates having the same alkyl groups as mentioned above; N-vinyl compounds having a cyclic amino group such as N-vinyl pyrrole, N-vinyl carbazole, N-vinyl indole, N-vinyl pyrrolidone, etc.

(e) Non-cyclic amino group-containing polymerizable monomers:

Aminoalkyl esters of α-methylene aliphatic monocarboxylic acids such as dimethylaminoethyl acrylate, diethylaminoethyl acrylate, dimethylaminopropyl acrylate, dimethylaminomethyl methacrylate, diethylaminoethyl methacrylate, dimethylaminopropyl methacrylate, etc.

(f) Maleimide series monomers:

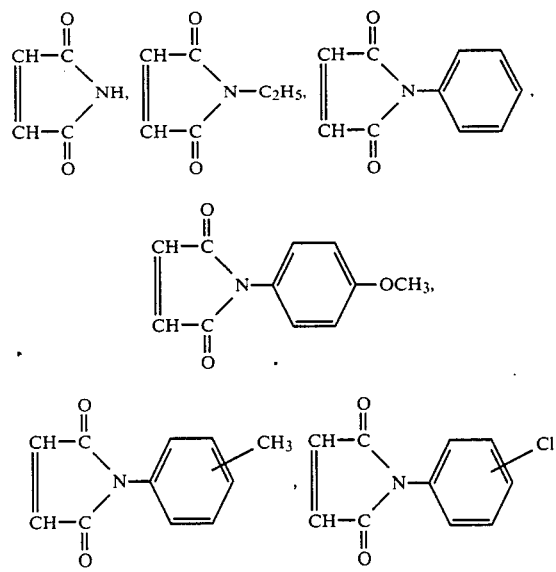

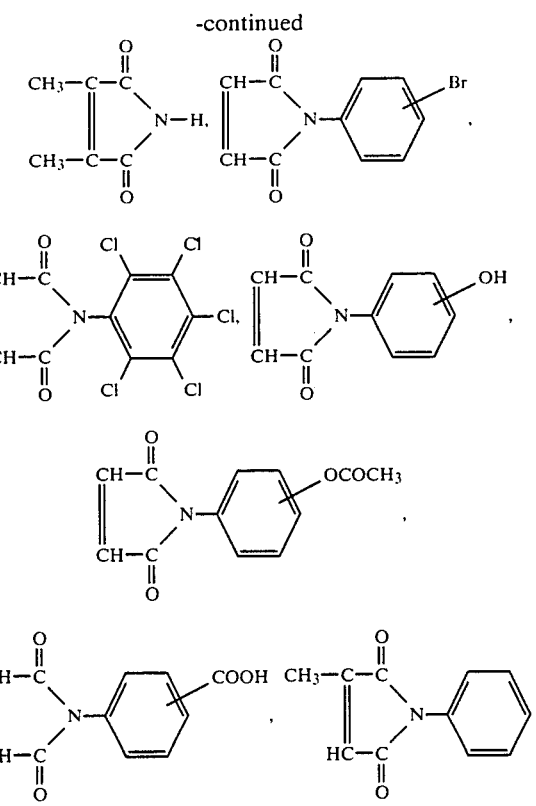

(g) Divinylbenzene, reaction products of glycol with methacrylic acid or acrylic acid:

Ethylene glycol dimethacrylate, 1,3-propylene glycol dimethacrylate, 1,4-butanediol dimethacrylate, 1,5-pentanediol dimethacrylate, 1,6-hexanediol dimethacrylate, neopentyl glycol dimethacrylate, diethylene glycol dimethacrylate, triethylene glycol dimethacrylate, polyethylene glycol dimethacrylate, tripropylene glycol dimethacrylate, hydroxypivalic acid neopentyl glycol ester dimethylacrylate, trimethylolethane trimethacrylate, trimethylolpropane trimethacrylate, pentaerythritol trimethyacrylate, pentaerythritol tetramethacrylate, trismethacryloxyethyl phosphate, bis(methacryloyoxyethyl)hydroxyethyl isocyanurate, tris(methacryloyloxyethyl)isocyanurate, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, polyethylene glycol diacrylate, tripropylene glycol diacrylate, hydroxypivalic acid neopentyl glycol ester diacrylate, trimethylolethane triacrylate, trimethylolpropane triacrylate, pentaerythritol triacrylate, pentaerythritol tetraacrylate, tris-acryloyloxyethyl phosphate, bis(acryloyloxyethyl)hydroxyethyl isocyanurate, tris(acryloyloxyethyl)isocyanurate, etc.; half esters of glycidyl methacrylate and methacrylic acid or acrylic acid; half esters of bisphenol type epoxy resins and methacrylic acid or acrylic acid; half esters of glycidyl acrylate and methacrylic acid or acrylic acid, etc.

Among these polymerizable unsaturated monomers mentioned above, those having one vinyl group in one molecule such as styrene, styrene derivatives, methacrylic acid esters, acrylic acid esters, fumaric acid esters and maleic acid esters are preferable, and methacrylic acid, acrylic acid, fumaric acid or maleic acid alkyl esters having $C_{1-5}$ alkyl groups are particularly preferable.

Among polymerizable unsaturated monomers having 2 or more vinyl groups in one molecule as shown in the above-mentioned (g), preferable ones are divinylbenzene, dimethylacrylates and diacrylates of $C_{2-6}$ methylene glycol, etc.

These preferable monomers can be used in an amount of 0 to 20% by weight based on the total weight of polymerizable unsaturated monomers.

It is also possible to use polymerizable unsaturated monomers represented by the formula:

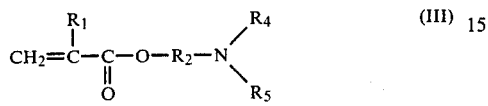

wherein $R_1$ and $R_2$ are as defined above; $R_4$ and $R_5$ are independently an alkyl group having 1 to 6 carbon atoms or a group of the formula:

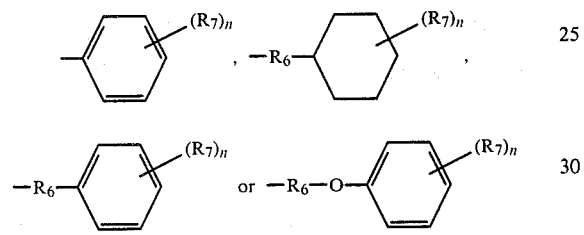

wherein $R_6$ is an alkylene group having 1 to 6 carbon atoms; $R_7$ is an alkyl group having 1 to 6 carbon atoms; n is zero or an integer of 1 to 5; and m is zero or an integer of 1 to 10, provided that the total number of carbon atoms of $R_2$, $R_4$ and $R_5$ is 4 or more, and when the ring is substituted with 2 or more $R_7$s (i.e. n or m is 2 or more), the $R_7$s may be the same or different.

When the binder polymer is obtained by copolymerizing at least one monomer of the formula (III) together with at least one monomer of the formula (I) and, if necessary other monomer(s), it is possible to provide better positive charge properties, moisture resistance and fixing properties to the resulting toner without using a charge imparting agent. In such a case, it is preferable to use the monomer of the formula (I) wherein $Y_1$ through $Y_8$ in the definition of $R_3$ is hydrogen, an alkyl group having 1 to 3 carbon atoms, or

in which $Z_4$ and $Z_5$ are as defined above. The amount of the monomer of the formula (III) used is preferably 0.05 to 20% by weight, more preferably 0.2 to 10% by weight, based on the total weight of the polymerizable unsaturated monomers. If the amount of monomer of the formula (III) is too small, the effect of imparting a positive charge to the toners by this monomer decreases, whereas if the amount is too large, the positive charge is lowered or there is a tendency to lower the charge stability during the repeated use. Further, if the total number of carbon atoms of $R_2$, $R_4$ and $R_5$ is less than 4, the moisture resistance of toners is lowered and there is no improvement in environmental resistance.

Concrete examples of the monomer of the formula (III) are as follows:

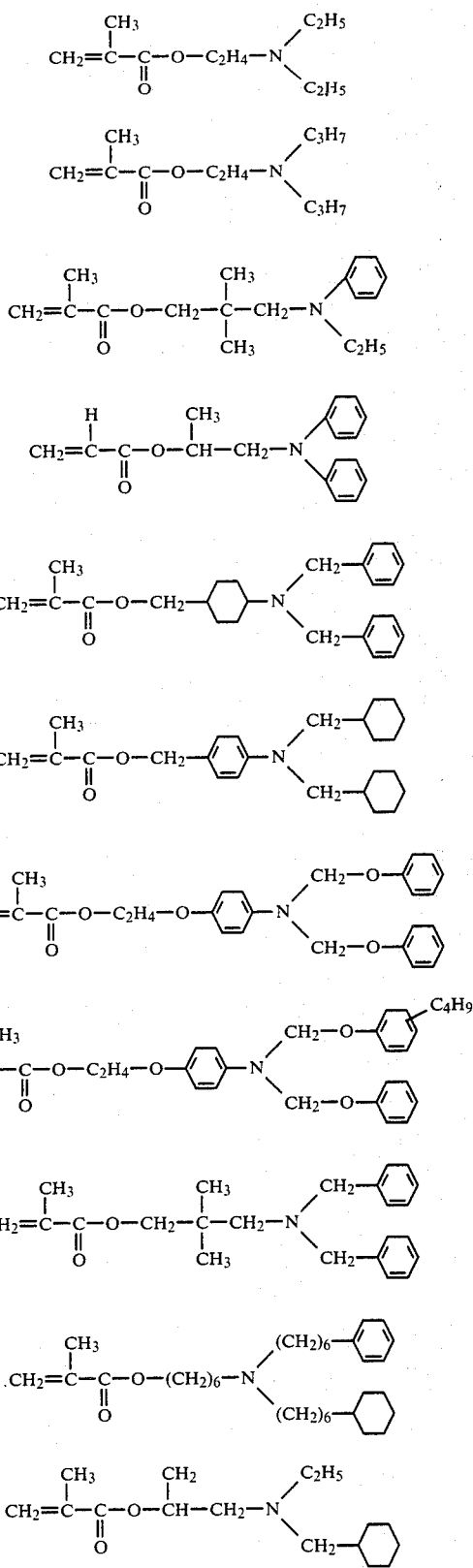

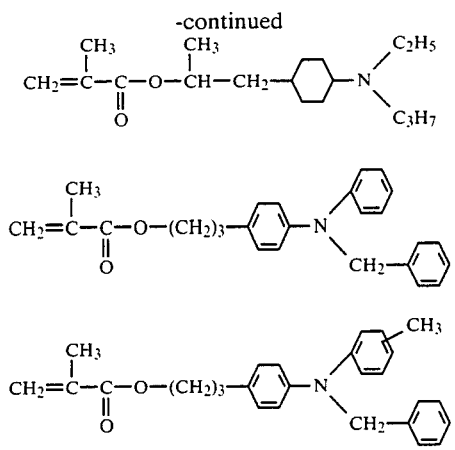

It is also possible to use polymerizable unsaturated monomer represented by the formula:

$$\begin{array}{c} R_8 \ R_9 \\ | \ \ | \\ C=C \\ | \ \ | \\ R_{10} \ R_{11} \end{array} \quad (IV)$$

wherein $R_8$, $R_9$, $R_{10}$ and $R_{11}$ are independently hydrogen, an alkyl group having 1 to 6 carbon atoms, a hydroxyl group

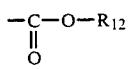

(in which $R_{12}$ is an alkyl group having 2 to 18 carbon atoms), or

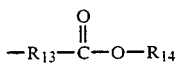

(in which $R_{13}$ is an alkylene group having 1 to 6 carbon atoms; and $R_{14}$ is an alkyl group having 2 to 18 carbon atoms), and at least two ester linkages are present in the molecule.

When the binder polymer is produced by copolymerizing at least one monomer of the formula (IV) together with at least one monomer of the formula (I) and, if necessary other monomer(s), it is possible to provide better fixing properties to the resulting toner. The amount of the monomer of the formula (IV) used is preferably 5 to 50% by weight, more preferably 10 to 40% by weight, based on the total weight of the polymerizable unsaturated monomers. If the amount of the monomer of the formula (IV) is too small, the improvement in fixing properties of toners is lowered, while if the amount is too much, there is a tendency to lower caking resistance of the toners.

Examples of the monomer of the formula (IV) are as follows:

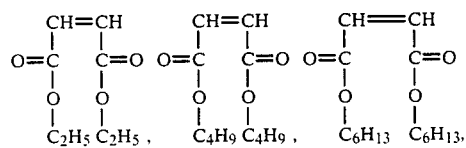

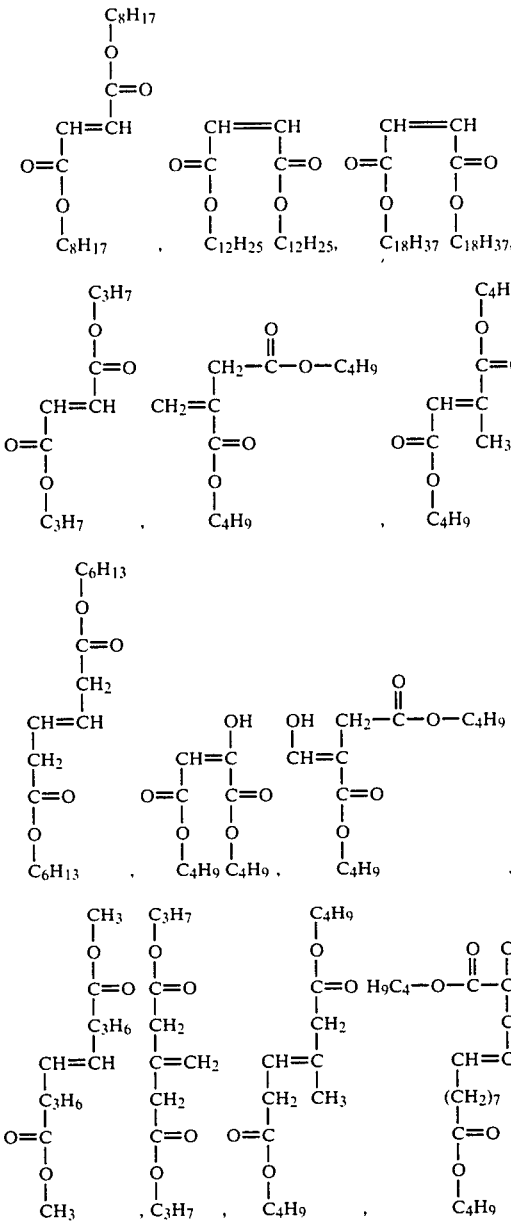

As other resins for making the blend (D) with at least one homopolymer or copolymer of (A) and/or at least one copolymer of (B), there can be used homopolymers or copolymers of the polymerizable unsaturated menomers other than those of the formula (I), silicone resins such as KR-216, KR-220, KR-152, KR-271, KR-255 (trade names, mfd. by Shin-etsu Chemical Industry Co., Ltd.), SR-2400, SR-2406, SH-840 (trade names, mfd. by Toray Silicone Co., Ltd.); norbornene series polymers such as 1-Solex (trade name, mfd. by CaF Chemical Co., Ltd.); polyester carbonates such as C-200A, C-250A (trade names, mfd. by Mitsubishi Chemical Industries Ltd.), Iupilon P-1000 (trade name, mfd. by Mitsubishi Gas Chemical Co., Ltd.); xylene resins such as Lignol R-70, R-120, R-140, P-2 (trade names, mfd. by Lignyte Co., Ltd.); epoxy resins such as Epikote 1004, 1007, 1009, 1010, YL-903, 906, Epikote 604 (trade names, mfd. by Shell Chemical Co.), Epomix R304, R307, R309 (trade names, mfd. by Mitsui Petrochemical Industries, Ltd.), diene series resins such as Nipol BR-1220, 1032, 1441, Nipol IR 2200, Nipol NBR, 2057S, 2007J (trade names, mdf. by Japanese Geon Co.); Polyester resins such as PC.RESIN 2H, 3H, 8H, 11A (trade names, mfd. by Hitachi Chemical Co., Ltd.), ATR 2005, 2009, 2010 (trade names, mdf. by Kao Soap Co., Ltd.); phenol resins, cumarone resins, polyamide resins, polyamide-imide resins, butyral resins, amino resins, urethane resins, etc. These polymers can be preferably used in an amount of 0 to 30% by weight based on the weight of the toner.

The binder polymer for the toner of this invention preferably has a glass transition point of 40° to 120° C. If the glass transition point is too low, there easily takes place caking (a phenomenon of causing masses by coagulation of toner particles) during the storage of toners or in a developing device in a printer or copying machine. On the other hand, if the glass transition point is too high, a longer time is required for a crushing step, which results in lowering productivity, when toners are produced by melt kneading, crushing and classifying steps. Further, when the fixing method of toners to transferring materials is carried out by a heat roll method or an oven method, the fixing temperature should be raised, which is contrary to energy saving. It is more preferable that the binder polymer has the glass transition point of 50° to 100° C. in order to make the effects better.

The monomers of the formula (I) and/or one or more other polymerizable unsaturated monomers can be polymerized by solution polymerization, bulk polymerization, emulsion polymerization, suspension polymerization, and the like by using a polymerization initiator to yield binary polymers and copolymers for the toner. As the polymerization initiator, there can be used acetyl peroxide, decanoyl peroxide, lauroyl peroxide, benzoyl peroxide, p-chlorobenzoyl peroxide, 2,4-dichlorobenzoyl peroxide, diisopropyl perdicarbonate, di-2-ethylhexyl perdicarbonate, acetyl cyclohexane sulfonyl peroxide, tert-butyl peracetate, tert-butyl perisolactate, azobisisobutyronitrile, 2,2'-azobis-2,4-dimethylvaleronitrile, tert-butyl per-2-ethylhexanoate, tert-butyl perbenzoate, etc. The polymerization initiator can be used in an amount of preferably 0.1 to 15% by weight based on the total weight of polymerable unsaturated monomers.

The toner of this invention may contain one or more colorants and/or magnetic powders.

As the colorants, there can be used conventional pigments and dyes such as carbon black, acetylene black, Hansa Yellow G, Cadmium Yellow, Molybdenum Orange, Permanent Orange, red oxide, Rhodamine Lake B, Fast Violet B, Methyl Violet Lake, Prussian blue, Phthalocyanine Blue, Chrome Green, Pigment Green B, zinc oxide, titanium oxide, nigrosine dyes, Methylene Blue, Rose Bengal, Quinoline Yellow, Ultramarine Blue, Chrome Yellow, Aniline Blue, Chalco Oil Blue, Rhodamine 6G Lake, Watchung Red Barium, Watchung Red strontium, Malachite Green Oxalate, Dupont Oil Red, and a mixture thereof. These colorants are used in the toner in an amount of preferably 1 to 60% by weight.

As the magnetic powder, there can be used powders of metals such as iron, manganese, nickel, cobalt, etc.; alloys of metals such as aluminum, cobalt, steel, lead, magnesium, nickel, tin, zinc, antimony, beryllium, bismuth, cadmium, calcium, manganese, selenium, titanium, tungsten, vanadium, etc., and a mixture thereof; metallic compounds containing metal oxides such as aluminum oxide, iron oxide, copper oxide, nickel oxide, zinc oxide, titanium oxide, magnesium oxide, chromium oxide, etc.; alloys showing ferromagnetism by heat treatment such as manganese-copper-aluminum, manganese-copper-tin and the like Heusler's alloys. The particle size of magnetic powder is preferably 10 $\mu$m or less, more preferably 1 $\mu$m or less. The magnetic powder is preferably contained in the toner in an amount of 30 to 70% by weight. When the magnetic powder is used, one or more colorants may be added in an amount of preferably 10% by weight of less based on the weight of the toner.

The toner of this invention may contain additives such as a charge control agent, etc. As the charge control agent, there can be used nitrosine dyes, fatty acid modified nitrosine dyes, metal-containing nigrosine dyes, metal-containing fatty acid modified nigrosine dyes, tetraalkyl ammonium halides, trialkyl ammonium halides, compounds of the formula:

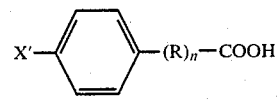

wherein X' is a halogen; R is an alkylene group having 1 to 3 carbon atoms; and n is zero or 1, polyamine compounds havng a structural unit of the formula:

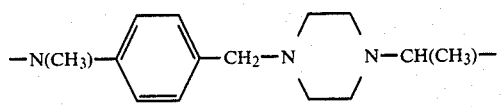

nitrile compounds having a structural unit of the formula:

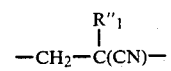

wherein R''$_1$ is hydrogen or an alkyl group having 1 to 3 carbon atoms, compounds of the formula:

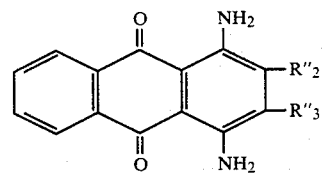

wherein R''$_2$ is an alkoxy group or a phenoxy group; R''$_3$ is hydrogen, an alkoxy group or a phenoxy group, monoalkyl tin oxides, dialkyl tin oxides, monoaryl tin oxides, compounds of the formula:

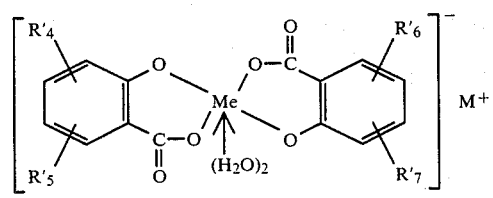

wherein R'₄, R'₅, R'₆ and R'₇ are independently hydrogen, an alkyl group having 1 to 9 carbon atoms, or a substituent group having an aromatic ring or a cyclohexene ring, provided that two or more groups are not hydrogen at the same time; Me is Cr, Co, or Fe; and M is H, K or Na or fatty acid ammonium, compounds of the formula:

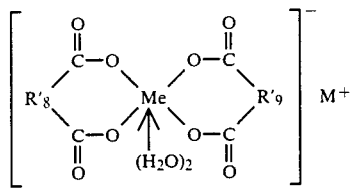

wherein R'₈ and R'₉ are independently an alkylene group having 1 to 9 carbon atoms, an aromatic ring or a cyclohexene ring; and Me and M are as defined above,

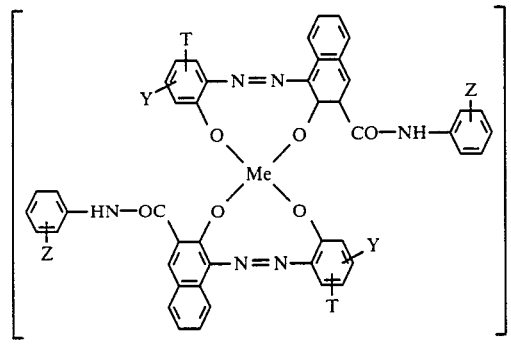

wherein T, Y and Z are independently hydrogen, a halogen, a carboxyl group, a hydroxyl group, a nitro group, a sulfone group or a sulfonamide group; M and Me are as defined above, tetrathiafulvalene alumina very fine powder, etc. The charge control agent is usually used in the toner in an amount of 0 to 20% by weight.

When a charge control agent is used, it is preferable to use a pale color or colorless charge control agent. By the use of the charge regulator, the defect of printed letters caused by the adhesion to nonrigid polyvinyl chloride sheets can further be prevented. The term "pale color" means that the color difference value is 2 or less between a toner using a charge control agent and a toner not using a charge control agent when measured by using a color difference meter.

Examples of the charge control agent having the color difference value of 2 or less are tetraalkyl ammonium halides, trialkylammonium halides, compounds of the formula:

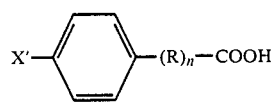

wherein X', R and n are as defined above, polyamine compounds having a structural unit of the formula:

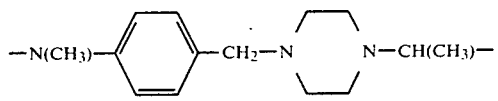

nitrile compounds having a structural unit of the formula:

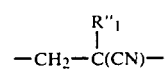

wherein R"₁ is as defined above, compounds of the formula:

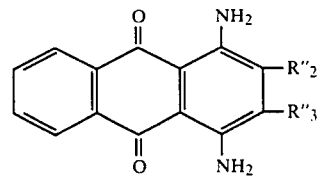

wherein R"₂ and R"₃ are as defined above, monoalkyl tin oxides, dialkyl tin oxides, monoaryl tin oxides, compounds of the formula:

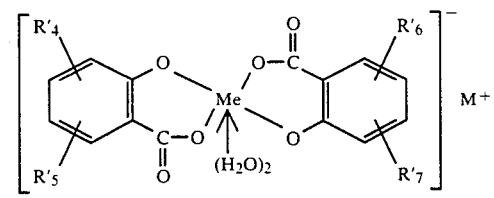

wherein R'₄, R'₅, R'₆, R'₇, Me and M are as defined above, compounds of the formula:

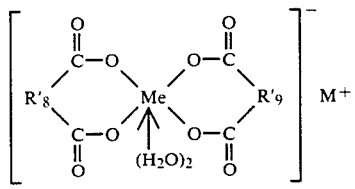

wherein R'₈, R'₉, Me and M are as defined above.

As other additives, there can be used one or more fluidity improving agents, cleaning improving agents, offset prevention agents, etc.

The fluidity improving agents imparts high fluidity to the toner so as to make continuous supply of the toner easy and to form visible images with good quality. As the fluidity improving agent, silica powder which has been made hydrophobic is most suitable. Such hydrophobic silica powder is obtained by reacting fine powder of silicon dioxide wherein surface silicon atoms are present in the form of silanol groups with a silane compound so as to bond the surface silicon atoms of silicon dioxide particles to oxygen atoms via hydrophobic groups.

Examples of the silane compounds are octyltrichlorosilane, decyltrichlorosilane, nonyltinchlorosilane, 4-isopropylphenyltrichlorosilane, 4-tert-butylphenyltrichlorosilane, dimethyldichlorosilane, dipentyldichlorosilane, dihexyldichlorosilane, dioctyldichlorosilane, dinonyldichlorosilane, didecyldichlorosilane, didodecyldichlorosilane, 4-tert-butylphenyloctyldichlorosilane, dioctyldichlorosilane, didecenyldichlorosilane, dinonenyldichlorosilane, di-2-ethyl-hexyldichlorosilane, di-3,3-dimethylpentyldichlorosilane, trimethylchlorosilane, trihexylchlorosilane, trioctylchlorosilane, tridecylchlorosilane, dioctylchlorosilane, octyldimethylchlorosilane, 4-isopropylbiphenyldiethylchlorosilane, etc.

THe hydrophobic silica powder preferably has an average particle size of 1 mμ to 100 μm, more preferably 2 mμ to 50 μm. If the particle size is less than 1 mμ, the silica powder fly away easily and is difficult in handling. On the other hand, if the particle size is no more than 100 μm, a sensitive plate is easily damaged.

The hydrophobic silica powder is available commercially under the trade names Aerosil R972, Silica D-17, R812, RA 200H, RX-C (mfd. by Nippon Aerosil Co., Ltd.), Tullanox 500 (mfd. by Tulco Inc.), etc.

The above-mentioned hydrophobic silica powder may be mixed with other materials for toners, followed by toner production. But a better method is to produce toners by using toner materials other than the hydrophobic silica powder, followed by addition of the hydrophobic silica powder to the resulting toners. In the latter case, the hydrophobic silica powder is added in an amount of preferably 0.01 to 15% by weight, more preferably 0.1 to 10% by weight, based on the weight of the toner powder containing no hydrophobic silica powder. If the adding amount is less than 0.01% by weight, the effect of improving the fluidity is not admitted, while if the amount is more than 15% by weight, the effect is not improved in proportion to the adding amount.

The cleaning improving agent prevents a so-called filming phenomenon which is caused by adhesion of a part of toner components to a photosensitive material or surfaces of carriers and makes it possible to form clear visible images without fogging even if used continuously for a long period of time.

Examples of the cleaning improving agent are metal salts of saturated or unsaturated fatty acids such as maleic acid, stearic acid, oleic acid, palmitic acid, caproic acid, linoleic acid, ricinoleic acid, etc, the metal being, for example, zinc, magnesium, calcium, cadmium, lead, iron, nickel, cobalt, copper, or aluminum. Among them, zinc stearate, calcium stearate, and magnesium stearate are particularly preferable.

When the cleaning improving agent is used, it is particularly preferable to add it in the same manner as the hydrophobic silica powder mentioned above as the latter case. The fatty acid metal salt is added in an amount of preferably 0.01 to 25% by weight, more preferably 0.1 to 10% by weight, based on the toner powder containing no fatty acid metal salt nor hydrophobic silica powder. If the amount is less than 0.01% by weight, no improvement in cleaning properties is admitted, while if the amount is more than 25% by weight, the effect is not increased proportionally.

Fixing of toner images on image supporters (transferring material is advantageously carried out generally by a heat fixing method. The heat fixing method includes a non-contact heat fixing method such as oven fixing, etc. and a contact heat fixing method such as heat roll fixing, etc. The contact heat fixing method is advantageous in that the heat efficiency is high, devices can be miniaturized, consumed electric power can be lessened, and the like. But the contact heat fixing method has a serious problem in that a part of toner image is transferred to a heat roll at the time of passing an image support carrying the toner image through the heat roll, and the transferred toner image is re-transferred to cause staining after the heat roll is revolved one time. The offset prevention agent is effective for preventing off set in the heat roll fixing method and for forming high quality images.

Examples of the offset prevention agent are polymers of olefin monomers such as ethylene, propylene, butene, pentene, hexene, heptene, octene, nonene, decene, 3-methyl-1-butene, 3-methyl-2-pentene, 3-propyl-5-methyl-2-hexene, etc.; copolymers of the above-mentioned olefin monomers and acrylic acid, methacrylic acid, vinyl acetate, etc.; lower alcohol esters of fatty acids such as butyl stearate, propyl stearate, etc.; polyhydric alcohol esters of fatty acids such as Kastor Wax A (mfd. by Itoh Oil MFG Co., Ltd.), Diamond Wax (mfd. by Shin-nippon Rika Co., Ltd.), etc.; higher alcohol esters of fatty acids such as Hoechst Wax E, Hoechst Wax-OP (mfd. by Farbwerke Hoechst AG.), carnauba wax, etc.; alkylene bisfatty acid amide compounds such as Bisamide Blast Flow (mfd. by Nitto Chemical Co., Ltd.), Amide 6L, 7S, and 6H (mfd. by Kawaken Fine Chemical Co., Ltd.), Hoechst Wax C (mfd. by Farbwerke AG.), etc,; fatty acid metal salts such as zinc stearate, calcium stearate, magnesium stearate, barium stearate, copper stearate, aluminum stearate, zinc oleate, magnesium oleate, zinc caprylate, magnesium caprylate, zinc linolate, calcium linolate, etc.; diene series resins having a weight average molecular weight of 50,000 or more such as Nipol NBR, 2057S, 2007J, BR1220 (mfd. by Japanese Geon Co., Ltd.), etc., hydroxyl group-containing vinyl resins, carboxyl group-containing vinyl resins, etc.

When the offset prevention agent is used, it is particularly preferable to produce toners by mixing with other toner-producing materials. The offset prevention agent is used in an amount of preferably 0.1 to 50% by weight, more preferably 1 to 30% by weight, based on the weight of toner. If the amount is less than 0.1% by weight or less, no effect of preventing offset is admitted, while if the amount is more than 50% by weight, the effect is not further improved.

In this invention, the above-mentioned fluidity improving agent, the cleaning improving agent and the offset prevention agent can be added alone or in combination.

The toner for developing latent electrostatic images can be produced by mixing the above-mentioned materials, for example, by the following method.

Weighed materials are pre-mixed by a W-cone, V-blender, Henschel mixer, or the like and then kneaded by using a pressure kneader, Banbury mixer, heat roll, extruder, or the like at a temperature sufficient to melt the resin. After cooling, the materials are roughly crushed by using a feather mill, pin mill, pulverizer, hammer mill, etc. Then, the crushed materials are sieved by using a Acucut classifier, Alpine classifier, or the like, to adjust the particle size preferably in the range of 5 to 30 μm.

The toner of this invention can be used in various fixing methods such as a so-called oiless and oil coat heat roll method, a flush method, an oven method, a pressure fixing method, etc. The toner of this invention is particularly suitable for the heat roll fixing method.

Further, the toner of this invention can be used in various cleaning methods such as a so-called fur brushing method, a blade method, etc.

This invention is illustrated by way of the following Examples, in which all the parts and percents are by weight unless otherwise specified.

EXAMPLES 1 TO 15

(1) Synthesis of Copolymers (a-1) to (m-1)

A mixed solution of 100 parts of toluene, monomers in amounts as listed in Table 1 and benzoyl peroxide were placed in a reactor and maintained at 90° C. for 3 hours. Then, the temperature was raised to 110° C. and maintained at that temperature for 10 hours. Then, the toluene was removed in a vacuum drier to give a copolymer. Glass transition points of the obtained copolymers are shown in Table 1, wherein the monomers 1 through 7 have been listed in the DESCRIPTION OF THE PREFERRED EMBODIMENTS with chemical formulae.

The glass transition points of the copolymers were measured by a thermo mechanical analysis method (penetration mode, load 70 g.f, a temperature rise rate 10° C./min).

(3) Evaluation Method

Copied products were formed by using a copying machine SF-750 (mfd. by Sharp Corp.) in Examples 1 to 6 and 9 to 15, or a copying machine NP-200J (mfd. by Canon Inc., the transferring to paper was conducted under negative voltage by a reverse development method) in Examples 7 and 8. The obtained printed products were sandwiched between sheets of plasticized polyvinyl chloride containing 25% of dioctyl phthalate and adhesion of copied letters to the plasticized polyvinyl chloride sheets (defects of printed letters by plasticized PVC in Table 2) was tested at 30° C. under a load of 5 gf/cm$^2$ for a test time of 1800 hours. The results are shown in Table 2.

In Table 2, the following materials were used.
Binder: Epoxy resin, Epikote 1007 (Shell Chemical Co.), Styrene-butadiene copolymer rubber, Nipol 2007J (Japanese Geon Co., Ltd.), Silicone resin KR 220 (Shin-etsu Chemical Industry Co., Ltd.).
Colorant: Carbon black #44 (Mitsubishi Chemical Industries, Ltd.)
Charge control agent:
  Dye, Oil Black SO (Orient Chemical Industries, Ltd.)
  Dibutyl tin oxide

TABLE 1

| | | Copolymer | | | | | | | | | | | | |
|---|---|---|---|---|---|---|---|---|---|---|---|---|---|---|
| | | a-1 | b-1 | c-1 | d-1 | e-1 | f-1 | g-1 | h-1 | i-1 | j-1 | k-1 | l-1 | m-1 |
| Formulation (parts) | Monomer 1 | 40 | | | | 20 | 70 | | | | 60 | | 40 | 50 |
| | Monomer 2 | | 30 | | | | | 80 | | | | 25 | | |
| | Monomer 3 | | | 20 | | | | | | 50 | | | | |
| | Monomer 4 | | | | 45 | | | | 30 | | | | | |
| | Monomer 5 | | | 20 | | | | | | | | 50 | | 30 |
| | Monomer 6 | | | | | 50 | | | | | | 10 | 30 | |
| | Monomer 7 | | | | | | 15 | | 40 | | | | 15 | |
| | Styrene | 52 | 55 | 45 | 39.5 | 44 | 54 | 15 | 20 | 10 | 10 | 10 | 5 | 10 |
| | Butyl acrylate | 8 | 10 | | 5 | 6 | 4 | 15 | | | | | | 10 |
| | Butyl methacrylate | | | 5 | 15 | 10 | | 7 | | | | 5 | 9.9 | |
| | Divinylbenzene | | | | 0.2 | | | | | | | | 0.1 | |
| | Benzoyl peroxide | 2.5 | 3 | 3.7 | 4.2 | 1.9 | 2.1 | 3.0 | 5.0 | 5.5 | 2.0 | 3.3 | 2.5 | 3.1 |
| Glass transition point (°C.) | | 90 | 71 | 83 | 68 | 65 | 80 | 98 | 63 | 88 | 75 | 60 | 73 | 77 |

(2) Production of Toners

Materials shown in Table 2 were pre-mixed in a Henschel mixer, and then melt kneaded at 70° C. in a kneader. Then, the cooled kneaded materials were finely pulverized by using a pin mill and a jet mill, followed by classification to give toners having an average particles size of 10 to 15 μm.

Magnetic powder: Magnetic MG-WS (Mitsui Mining & Smelting Co., Ltd.)
Olefin polymer:
  Polypropylene, Viscol 550 (Sanyo Chemical Industries Co., Ltd.)
  Polyethylene, Sanwax 171P (Sanyo Chemical Industries Co., Ltd.)
  A-C polyethylene 6A (Allied Chemicals Co.)

TABLE 2

| | | | Example No. | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| Formulation (parts) | Binder | Copolymer a-1 | 890 | | | | | | 190 | 250 | 100 | | 480 | | | | 530 |
| | | Copolymer b-1 | | 880 | | | | | | 250 | 100 | | | 300 | | | |
| | | Copolymer c-1 | | | 910 | | | | | | 70 | | | | | | |
| | | Copolymer d-1 | | | | 870 | | | | | | | | | | | |
| | | Copolymer e-1 | | | | | 880 | | | 200 | | | | | | | |
| | | Copolymer f-1 | | | | | | 600 | | | | | | | | | |
| | | Copolymer g-1 | | | | | | | | | | 440 | | | | | |
| | | Copolymer h-1 | | | | | | | | | | | 400 | | | | |
| | | Copolymer i-1 | | | | | | | | | | | | 400 | | | |
| | | Copolymer j-1 | | | | | | | | | | | | | 740 | | |
| | | Copolymer k-1 | | | | | | | | | | | | | | 870 | |
| | | Copolymer l-1 | | | | | | | | | | | | | | 870 | |
| | | Copolymer m-1 | | | | | | | | | | | | | | | 300 |
| | | Epikote 1007 | | | | | | | 100 | | | 440 | | 100 | 150 | | |
| | | Nipol 2007J | | | | | 20 | | | | | | 70 | | | | 50 |
| | | Silicone Resin KR220 | | | | 30 | | | | | | | | | | | |
| | Colorant | Carbon black #44 | 70 | 60 | 50 | 50 | 60 | 50 | | 10 | 60 | 70 | 80 | 50 | 60 | 60 | 60 |
| | Charge | Oil Black SO | | | | 20 | 25 | | 20 | 30 | | 5 | | 10 | 15 | 15 | |

TABLE 2-continued

| | | Example No. | | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| | control agent | Dibutyl tin oxide | 30 | 40 | 10 | | 30 | 20 | | 30 | 30 | 40 | 20 | 30 | 25 | 25 | 30 |
| | Magnetic powder | Magnetite MG-WS | | | | | | | 450 | 470 | | | | | | | |
| | Olefin polymer | Viscol 550P | 10 | | | 15 | | 10 | 20 | | 25 | | 20 | | 10 | 10 | 10 |
| | | Sanwax 171P | | 20 | | 10 | | | | 10 | | 30 | | 30 | 20 | 20 | 10 |
| | | A-C polyethylene 6A | | | 10 | | 10 | 10 | | 10 | | | | | | | 10 |
| Properties | Glass transition point of binder (°C.) | | 90 | 71 | 83 | 66 | 64 | 84 | 81 | 74 | 95 | 78 | 83 | 74 | 60 | 73 | 85 |
| | Defects of copied letters by plasticized PVC | | No | No | No | No | No | No | No | No | No | No | No | No | No | No | No |

EXAMPLE 16

A toner obtained by adding 0.1% of Tullanox 500 to 100 parts of the toner of Example 1 was evaluated in the same manner as described in Example 1. The defects of printed letters by plasticized PVC was not admitted.

The copied products obtained in Example 1 to 16 had an image density of 1.2 or more, and fogging in white portions of 0.08 or less. The image density and the fogging value were optical reflectional densities measured by using a Macbeth reflection densitometer (mfd. by Adivision of Kollmorgen Corp.).

COMPARATIVE EXAMPLE 1

When styrene-methyl methacrylate (70:30 weight ratio) copolymer was used in place of the copolymer (a-1) of Example 1, there took place defects of copied letters by plasticized PVC and no letter could be read.

EXAMPLES 17 TO 26, COMPARATIVE EXAMPLES 2 TO 3

(1) Synthesis of Copolymers

In a reactor, 200 parts of water, and 0.3 part of suspension agent (polyvinyl alcohol, Denka Poval W-24, trade name, mfd. by Denki Kagaku Kogyo K.K.) were placed and dissolved uniformly. The temperature was raised to 90° C. and a solution obtained by dissolving monomers as listed in Table 3 and 2% of benzoyl peroxide was added thereto dropwise in 2 hours with stirring to carry out suspension polymerization. The temperature was maintained at 90° C. for 10 hours with stirring. After cooling and filtering, the obtained solid was sufficiently dried to yield a copolymer. Glass transition points of the copolymers are shown in Table 3.

(2) Production of Toners

Materials shown in Table 4 as a whole were premixed in a Henschel mixer, and then melt kneaded at 90° C. by using a uniaxial kneader. After cooling, the kneaded materials were finely pulverized by using a pin mill and a jet mill, followed by classification by using a vibrating sieve to give toners having an average particle size of 10 to 15 μm.

(3) Production of Developers and Tests

Developers were produced by mixing 3 parts of a toner, and 97 parts of iron oxide powder having an apparent density of 3.5 to 4.5 g/cm$^3$, and a particle size of 44 to 177 μm in an amount of 90% or more.

An OPC (organic photoconductor) drum rotating at a peripheral speed of about 20 cm/sec was negatively charged uniformly with a corona voltage of −6 KV, subjected to writing of information by a He-Ne laser, followed by reverse development by a magnetic brushing method using a developer mentioned above. Then, the fixing was carried out by using a pressure roll fixing device. Optical reflectional densities of printed letter portions and fogging portions of the obtained fixed images were measured by using a microphotometer MPM type (mfd. by Union Optical Co., Ltd.). The results are shown in Table 5.

The quality of printed letters after printing 200,000 sheets of paper was judged by changes in printed letter density and an increase of fogging.

The defects of printed letters by plasticized PVC was measured by sandwiching a printed product between sheets of plasticized polyvinyl chloride containing 30% of dioctyl phthalate at 40° C under a load of 100 gf/cm$^2$ for 300 hours.

TABLE 3

| | | Copolymer | | | | | | | | | |
|---|---|---|---|---|---|---|---|---|---|---|---|
| | | a-2 | b-2 | c-2 | d-2 | e-2 | f-2 | g-2 | h-2 | i-2 | j-2 |
| Monomer Composition (parts) | Monomer 3 | 35.0 | 25.0 | | | 15.8 | | 7.0 | | 28.0 | 25.0 |
| | Monomer 8 | | | 30.0 | | | | | | | |
| | Monomer 9 | | | 10.0 | | | | | | | |
| | Monomer 10 | | | 20.0 | | | | 30.0 | | | |
| | Monomer 11 | | | | 25.0 | | | | | | |
| | Monomer 12 | | | | 13.0 | | | | | | |
| | Monomer 13 | | | | 30.0 | 23.0 | | | | | |
| | Monomer 14 | | | | | | | | | 7.0 | |
| | Monomer 15 | | | | | | | | | | 10.0 |
| | Styrene | 50.0 | 53.0 | 20.0 | | 40.0 | 70.0 | 85.0 | 35.0 | 50.0 | 50.0 |
| | Butyl acrylate | 15.0 | | 10.0 | | 8.0 | | 8.0 | 35.0 | 15.0 | 10.0 |
| | Butyl methacrylate | | 22.0 | 10.0 | 32.0 | 13.0 | 30.0 | | | | 10.0 |
| | Divinylbenzene | | | | | 0.2 | | | | | |
| Glass transition point of copolymer (°C.) | | 93 | 79 | 75 | 55 | 68 | 70 | 70 | 37 | 88 | 83 |

Caking resistance of toners was evaluated at 50° C., in a humidity of 60% RH for 18 hours.

As is clear from Table 5, when printed by using the developers obtained by using toners of Examples 17 to 24, there were obtained printed letters showing good fixing strength (judged from the printed letter density and the fogging density), and no lowering in the quality of printed letters was admitted even after 200,000 sheets of paper were printed. Further, there took place no defects of printed letters by plasticized PVC and the caking resistance was also good. In contrast, in the case of the toner of Comparative Example 2, the fogging took place on the whole surface and the evaluation was impoissible. The toner of Comparative Example 3 lowered the quality of printed letters with the continuation of printing and was poor in the caking resistance. There also took place the defects of printed letters by plasticized PVC.

In Table 4, the following materials were used other than those used in Table 2:
Negative charge material: Bontron S31 (Orient Chemical Industries, Ltd.)
Colorant:
Cyanine Blue B (Toyo Ink Manufacturing Co., Ltd.)
Watchung Red Barium
Offset prevention agent (Olefin polymer):
Viscol 550P (Sanyo Chemical Industries Co., Ltd.)
Popko 739 (Noda Wax Co., Ltd.)

In Table 5, in Example 26, the transport of toner became bad after printing 10,000 sheets of paper and the printing became impossible. In Comparative Example 3, the printed letter density was lowered to 1.0 and the fogging density increased to 0.15 after printing 20,000 sheets of paper. The printed letter density was lowered to 1.4 and the fogging density increased to 0.3 after printing 100,000 sheets of paper.

TABLE 4

| | | \multicolumn{12}{c}{Toner (parts)} |
|---|---|---|---|---|---|---|---|---|---|---|---|---|---|
| | | No. 1 | No. 2 | No. 3 | No. 4 | No. 5 | No. 6 | No. 7 | No. 8 | No. 9 | No. 10 | No. 11 | No. 12 |
| Binder resin | Copolymer a-2 | 89 | | | | | 44 | 50 | | | | 20 | 19 |
| | Copolymer b-2 | | 85 | | | | | | | | | | |
| | Copolymer c-2 | | | 63 | | | | 20 | | | | | |
| | Copolymer d-2 | | | | 90 | | | 17 | | | | | |
| | Copolymer e-2 | | | 30 | | 43 | | | | | | | |
| | Copolymer f-2 | | | | | | | | 89 | 86 | | | |
| | Copolymer g-2 | | | | | | | | | | 89 | | |
| | Copolymer h-2 | | | | | | | | | | | 89 | |
| | Copolymer i-2 | | | | | | | | | | | 69 | |
| | Copolymer j-2 | | | | | | | | | | | | 70 |
| | Epikote 1007 | | | 5 | | | | | | | | | |
| | Nipol 2007J | 2 | | | 3 | | 5 | 2 | | | 2 | 2 | 2 |
| Negative charge material | Bontron S31 | | | | | | | | | 3 | | | |
| Colorant | Carbon black #44 | 7 | | | 5 | 10 | 5 | 7 | 8 | 7 | 7 | 5 | |
| | Cyanine Blue B | | 8 | | | | | | | | | | 8 |
| | Watchung Red Barium | | | 5 | | | | | | | | | |
| Offset prevention agent | Viscol 550P | 2 | | | 1 | | | 2 | | 2 | 2 | 2 | 2 |
| | Popko 739 | | 2 | 2 | 1 | 3 | 3 | | 3 | | | 2 | |
| | Blow-off charge amount ($\mu$C/g) | −19 | −12 | −19 | −13 | −19 | −20 | −2 | −20 | −7 | −11 | −18 | −15 |

TABLE 5

| | \multicolumn{10}{c}{Example} | \multicolumn{2}{c}{Comparative Example} |
|---|---|---|---|---|---|---|---|---|---|---|---|---|
| Example No. | 17 | 18 | 19 | 20 | 21 | 22 | 23 | 24 | 25 | 26 | 2 | 3 |
| Toner No. | No. 1 | No. 2 | No. 3 | No. 4 | No. 5 | No. 6 | No. 11 | No. 12 | No. 9 | No. 10 | No. 7 | No. 8 |
| Printed letter density *1 | 1.3 | 1.1 | 1.1 | 1.3 | 1.3 | 1.3 | 1.2 | 1.2 | 1.4 | 1.3 | — | 1.3 |
| Fogging portion density *1 | 0.07 | 0.07 | 0.07 | 0.07 | 0.07 | 0.07 | 0.07 | 0.08 | 0.2 | 0.1 | — | 0.09 |
| Quality of printed letters | Not lowered | Not lowered | Not lowered | Not lowered | Not lowered | Not lowered | Not lowered | Not lowered | Not lowered | lowered | — | Lowered remarkably |
| Filming to photoconductor | No | No | No | No | No | No | No | No | Partially | Partially | — | Yes |
| Defects of printed letters by plasticized PVC | No | No | No | No | No | No | No | No | Partially occurred | Partially occurred | — | Yes (almost) |
| Caking resistance | Good | Good | Good | Good | Good | Good | Good | Good | Good | Poor | — | Good |

(Note)
*1: Optical reflectional density.

EXAMPLES 27 TO 36, COMPARATIVE EXAMPLES 4 TO 5

(1) Copolymers were synthesized by using monomers listed in Table 6 in the same manner as described in Examples 17 to 26 and Comparative Examples 2 to 3. Glass transition points of the copolymers are shown in Table 6.

(2) Toners were prepared by using materials shown in Table 7 in the same manner as described in Examples 17 to 26 and Comparative Examples 2 to 3.

(3) Developers were prepared and tested in the same manner as described in Examples 17 to 26 and Comparative Examples 2 to 3.

As the photoconductor, there was used a selenium drum, which was positively charged by a corona voltage of +6 KV.

The results are shown in Table 8.

In Table 7, the following materials were used other than those used in Table 2:
Positive charging material:
  Oil Black BY (Orient Chemical Industries, Ltd.)
  Oil Black SO (Orient Chemical Industries, Ltd.)

In Table 8, in Example 36, the transport of toner became bad after printing 10,000 sheets of paper and the printing became impossible. In Comparative Example 5, the printed letter density was lowered to 1.0 and the fogging density increased to 0.12 after printing 20,000 sheets of paper. The printed letter density was lowered

TABLE 6

| | | a-3 | b-3 | c-3 | d-3 | e-3 | f-3 | g-3 | h-3 | i-3 | j-3 |
|---|---|---|---|---|---|---|---|---|---|---|---|
| Monomer composition (parts) | Monomer 16 | 38.0 | 25.0 | | | 15.8 | | 7.0 | | 30.0 | 30.0 |
| | Monomer 17 | | | 30.0 | | | | | 30.0 | | |
| | Monomer 18 | | | 15.0 | | | | | | | |
| | Monomer 19 | | | 23.0 | | | | | | | |
| | Monomer 20 | | | | 22.0 | | | | | | |
| | Monomer 21 | | | | 23.0 | | | | | | |
| | Monomer 22 | | | | | 19.0 | | | | | |
| | Monomer 23 | | | | | | | | | 8.0 | |
| | Monomer 24 | | | | | | | | | | 10.0 |
| | Styrene | 52.0 | 60.0 | 21.0 | 40.0 | 40.0 | 70.0 | 85.0 | 35.0 | 52.0 | 55.0 |
| | Butyl acrylate | 10.0 | 15.0 | 11.0 | | 5.0 | | 8.0 | 35.0 | 10.0 | 5.0 |
| | Butyl methacrylate | | | | 15.0 | 20.0 | 30.0 | | | | |
| | Divinylbenzene | | | | | 0.2 | | | | | |
| Glass transition point of copolymer (°C.) | | 95 | 80 | 74 | 55 | 65 | 70 | 70 | 38 | 90 | 85 |

TABLE 7

| | | Example | | | | | | | | | | Comp. Example (parts) | |
|---|---|---|---|---|---|---|---|---|---|---|---|---|---|
| | | 27 | 28 | 29 | 30 | 31 | 32 | 33 | 34 | 35 | 36 | 4 | 5 |
| Binder resin | Copolymer a-3 | 91 | | | | | 50 | 50 | 30 | | | | |
| | Copolymer b-3 | | 80 | | | | | | 10 | | | | |
| | Copolymer c-3 | | | 93 | | | 20 | | | | | | |
| | Copolymer d-3 | | | | 92 | | 17 | | | | | | |
| | Copolymer e-3 | | | | | 89 | | | | | | | |
| | Copolymer f-3 | | | | | | | | | | | 91 | 84 |
| | Copolymer g-3 | | | | | | | | | 91 | | | |
| | Copolymer h-3 | | | | | | | | | | 91 | | |
| | Copolymer i-3 | | | | | | | 40 | | | | | |
| | Copolymer j-3 | | | | | | | | 50 | | | | |
| | Epikote 1007 | | 10 | | | | | | | | | | |
| | Nipol 2007J | | | | | | | 5 | | | | | |
| Positive charge material | Oil Black BY | | | | | | | | | | | 4 | |
| | Oil Black SO | | | | | | | | | | | | 1 |
| Colorant | Carbon black #44 | 7 | | | 5 | 8 | 5 | 7 | | 7 | 7 | 7 | 8 |
| | Cyanine Blue B | | 8 | | | | | | | | | | |
| | Watchung Red Barium | | | 5 | | | | | 6 | | | | |
| Offset prevention agent | Viscol 550P | 2 | | | 2 | | 2 | 2 | 2 | 2 | 2 | 2 | |
| | Popko 739 | | 2 | 2 | | 1 | 3 | 3 | 1 | 2 | | | 3 |
| Blow-off charge amount (μc/g) | | +18 | +13 | +14 | +19 | +15 | +17 | +19 | +15 | +5 | 16 | −2 | +20 |

TABLE 8

| | Example | | | | | | | | | | Comparative Example | |
|---|---|---|---|---|---|---|---|---|---|---|---|---|
| | 27 | 28 | 29 | 30 | 31 | 32 | 33 | 34 | 35 | 36 | 4 | 5 |
| Printed letter | 1.3 | 1.1 | 1.1 | 1.3 | 1.3 | 1.3 | 1.2 | 1.2 | 1.4 | 1.3 | — | 1.0 |
| Fogging density | 0.07 | 0.07 | 0.07 | 0.07 | 0.07 | 0.07 | 0.07 | 0.07 | 0.2 | 0.1 | — | 0.09 |
| Quality of printed letters | Not lowered | Not lowered | Not lowered | Not lowered | Not lowered | Not lowered | Not lowered | Not lowered | Not lowered | lowered | — | lowered |
| Filming to photoconductor | No | No | No | No | No | No | No | No | Partially occurred | Partially occurred | — | Yes |
| Defects of printed letters by plasticized PVC | No | No | No | No | No | No | No | No | Partially occurred | Partially occurred | — | Yes (almost) |
| Caking resistance | Good | Good | Good | Good | Good | Good | Good | Good | Good | Poor | — | Good | to 1.4 and the fogging density increased to 0.23 after printing 100,000 sheets of paper.

As is clear from Table 8, when printed by using the developers obtained by using toners of Examples 27 to 34, there were obtained printed letters showing good fixing strength (judged from the printed letter density and the fogging density), and no lowering in the quality of printed letters was admitted even after 200,000 sheets of paper were printed. Further, there took place no defects of printed letters by plasticized PVC and the caking resistance was also good. In contrast, in the case of the toner of Comparative Example 4, no positive charge was shown. In Comparative Example 5, the quality of printed letters was lowered with the continuation of printing and the caking resistance was poor. There also took place the defects of printed letters by plasticized PVC.

EXAMPLES 37 TO 45

(1) Synthesis of Copolymers

In a reactor, 2000 parts of water, 3 parts of polyvinyl alcohol (Denka Poval W-24, mfd. by Denki Kagaku Kogyo K.K.), 0.1 part of sodium nitrite, monomers shown in Table 9 and a polymerization initiator as shown in Table 9 were placed and polymerized at 80° to 90° C. for 10 hours, followed by filtration and drying to give a copolymer.

(2) Production of Toners

Materials shown in Table 10 as a whole were pre-mixed in a Henschel mixer, and then melt kneaded in a kneader. Then, the cooled kneaded materials were finely pulverized by using a pin mill and a jet mill, followed by classification to give toners having an average particle size of 10 to 15 μm.

(3) Evaluation Method

Printed products were formed by producing two-component developer containing as a carrier EFV 200-300 (flat iron oxide powder, mfd. by Nippon Iron Powder Co., Ltd.) with a toner concentration of 7%, and using a copying machine SF-750 (mfd. by Sharp Corp.) in Examples 37 to 41, 43 to 45 and Comparative Example 6 mentioned below. On the other hand, printed products were obtained by producing two-component developer containing as a carrier Z-200 (flat iron oxide powder, mfd. by Nippon Iron Powder Co., Ltd.) with a toner concentration of 6%, and using a copying machine Shuttlex 802 (mfd. by Sanyo Electric Co., Ltd.) in Example 42. The obtained printed products were sandwiched between sheets of plasticized PVC containing 25% of dioctyl phthalate and adhesion of printed letters to the plasticized PVC was tested at 30° C. under a load of 5 gf/cm$^2$ for 1800 hours.

The results are shown in Table 10.

TABLE 9

(parts)

| | Copolymer | | | | | | | | | | | |
|---|---|---|---|---|---|---|---|---|---|---|---|---|
| | a-4 | b-4 | c-4 | d-4 | e-4 | f-4 | g-4 | h-4 | i-4 | j-4 | k-4 | l-4 |
| Monomer 25 | 300 | | | | 100 | 100 | | | 300 | | | 700 |
| Monomer 26 | | 500 | | | | | | | | 300 | | 100 |
| Monomer 27 | | | 400 | | | | | | | | 200 | |
| Monomer 28 | | | 200 | 100 | | | | | | | 100 | |
| Monomer 29 | | | | 500 | | | | | | | | |
| Monomer 30 | | | | | 200 | | | | | | | |
| Monomer 31 | | | | | 200 | | | | | | | |
| Monomer 32 | | | | | | 100 | | | | | | |
| Monomer 33 | | | | 100 | 300 | | | | | | | |
| Monomer 34 | | | | | | | 100 | | | | | |
| Monomer 35 | | | | | | | 200 | | | | | |
| Monomer 36 | | | | | | | | 400 | | | | |
| Styrene | 150 | 300 | 200 | | | 500 | 500 | 300 | 300 | 150 | 500 | |
| Butyl methacrylate | | | 100 | 300 | 200 | | | 100 | | 250 | | 200 |
| Butyl acrylate | 175 | 200 | 100 | | | 150 | 200 | 100 | 200 | | 100 | |
| Morpholinoethyl methacrylate | | | | | | | | | 200 | | | |
| Diethylaminoethyl methacrylate | | | | | | | | | | 200 | | |
| 2-Vinylpyridine | | | | | | | | | | 100 | | |
| Phthalimidethyl methacrylate | 375 | | | | | | | | | | | 98 |
| Phthalimidepropyl methacrylate | | | | | | 150 | | 100 | | | | |
| Divinylbenzene | | | | | | | | | | | | 2 |
| Benzoyl peroxide | 30 | 40 | | 20 | | 30 | | 30 | | | 30 | 50 |
| 2,2'-Azobis (2,4-dimethyl-valeronitrile) | | | 30 | | 30 | | 20 | | 30 | 30 | | |

TABLE 10

| | | | Example | | | | | | | | |
|---|---|---|---|---|---|---|---|---|---|---|---|
| | | | 37 | 38 | 39 | 40 | 41 | 42 | 43 | 44 | 45 |
| Formu-lation (parts) | Binder | Copolymer a-4 | 880 | | | | | | | | 430 |
| | | Copolymer b-4 | | 895 | | | | | | | |
| | | Copolymer c-4 | | | 910 | | | | | | |
| | | Copolymer d-4 | | | | 820 | | | | | |
| | | Copolymer e-4 | | | | | 480 | | | | |
| | | Copolymer f-4 | | | | | 400 | | | | |
| | | Copolymer g-4 | | | | | | 750 | | | |
| | | Copolymer h-4 | | | | | | | 800 | | |
| | | Copolymer i-4 | | | | | | | | 500 | |
| | | Copolymer j-4 | | | | | | | | 430 | |
| | | Copolymer k-4 | | | | | | 100 | | | |
| | | Copolymer l-4 | | | | | | | | | 450 |

TABLE 10-continued

| | | Example | | | | | | | | |
|---|---|---|---|---|---|---|---|---|---|---|
| | | 37 | 38 | 39 | 40 | 41 | 42 | 43 | 44 | 45 |
| Other resin | Epikote 1001 | | | | 50 | | 100 | | | |
| | Epikote 1007 | | | | | 100 | | | | |
| | Nipol 2007J | | | | | | 50 | | | |
| Colorant | Carbon Black #44 | 70 | 60 | 50 | 70 | 70 | 70 | 80 | 50 | 70 |
| Charge control agent | Oil Black BY | 30 | 10 | 20 | | 10 | | | | 30 |
| | Dibutyl tin oxide | | 10 | | 30 | 20 | | | | |
| Olefin polymer | Viscol 550P | 20 | 20 | 10 | 30 | | 30 | 10 | 10 | 10 |
| | Sanwax 171P | | | 5 | 10 | | 20 | | 10 | 10 | 10 |
| Glass transition point of binder (°C.) | | 83 | 77 | 71 | 60 | 75 | 67 | 78 | 70 | 90 |
| Image density | | 1.2 | 1.3 | 1.2 | 1.3 | 1.2 | 1.3 | 1.3 | 1.2 | 1.2 |
| Fogging density | | 0.08 | 0.08 | 0.08 | 0.08 | 0.07 | 0.08 | 0.07 | 0.08 | 0.08 |
| Defects of printed letter by plasticized PVC | | No | No | No | No | No | No | No | No | No |

COMPARATIVE EXAMPLE 6

When styrene-butyl methacrylate (70:30 weight ratio) copolymer was used in place of the copolymer a-4 in Example 37 and evaluated in the same manner as described in Examples 37 to 45, there took place defects of printed letters by plasticized PVC and reading of the printed letters was impossible.

EXAMPLES 46 TO 50, COMPARATIVE EXAMPLES 7 TO 10

(1) Synthesis of Copolymers

In a reactor, 200 parts of water, 3 parts of a suspension agent (polyvinyl alcohol, Denka Poval W-24, a trademark, mfd. by Denki Kagaku Kogyo K.K.), 200 ppm of sodium nitrite based on the total amounts of monomers, 100 ppm of sodium chloride based on the total amounts of monomers, monomers mentioned below, and a polymerization initiator were placed and polymerized at 80° C. for 1 hour and at 90° C. for 10 hours. After cooling and filtering, the resulting solid was dried with hot air to give copolymers. Glass transition points (Tg) of the resulting copolymers were measured as mentioned above.

Monomers B-1 and B-2 are as shown in the following formulae:

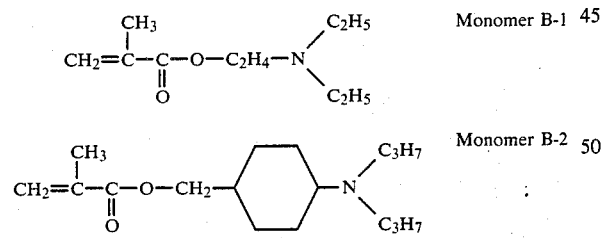

Monomer B-1

Monomer B-2

| | Parts |
|---|---|
| Copolymer a-5: | |
| Monomer composition | |
| Monomer 1 | 40.0 |
| Monomer B-1 | 0.5 |
| Styrene | 43.0 |
| Butyl acrylate | 16.5 |
| Polymerization initiator | |
| Azobisisobutyronitrile | 1.0 |
| 2,2′-Azobis(2,4-dimethylvaleronitrile) | 1.3 |
| Tg of copolymer of a-5: 75° C. | |
| Copolymer b-5: | |
| Monomer composition | |

-continued

| | Parts |
|---|---|
| Monomer 1 | 17.0 |
| Monomer 37 | 10.0 |
| Monomer B-2 | 2.0 |
| Styrene | 37.8 |
| Butyl methacrylate | 30.0 |
| N—Phenylmaleimide | 3.0 |
| Divinylbenzene | 0.2 |
| Polymerization initiator | |
| 2,2′-Azobis(2,4-dimethylvaleronitrile) | 1.7 |
| Azobisisobutyronitrile | 1.0 |
| Tg of copolymer b-5: 71° C. | |
| Copolymer c-5: | |
| Monomer composition | |
| Monomer 1 | 30.0 |
| Monomer 38 | 30.0 |
| Monomer B-1 | 5.0 |
| Styrene | 22.0 |
| Butyl acrylate | 13.0 |
| Polymerization initiator | |
| 2,2′-Azobis(2,4-dimethylvaleronitrile) | 1.7 |
| t-Butylperoxy(2-ethyl hexanoate) | 1.0 |
| Tg. of copolymer c-5: 69° C. | |
| Copolymer d-5: | |
| Monomer composition | |
| Monomer 1 | 10.0 |
| Monomer 39 | 5.0 |
| Monomer B-1 | 0.2 |
| Styrene | 53.8 |
| Butyl acrylate | 31.0 |
| Polymerization initiator | |
| 1,1-Bis(t-butylperoxy)-3,3,5-trimethylcyclohexane | 1.0 |
| Tg. of copolymer d-5: 45° C. | |
| Copolymer e-5: | |
| Monomer composition | |
| Monomer 1 | 35.0 |
| Monomer B-1 | 5.0 |
| Monomer B-2 | 5.0 |
| Styrene | 40.0 |
| Butyl acrylate | 8.0 |
| Butyl methacrylate | 5.0 |
| N—Phenylmaleimide | 2.0 |
| Polymerization initiator | |
| Azobis isobutyronitrile | 1.5 |
| 2,2′-Azobis(2,4-dimethylvaleronitrile) | 2.0 |
| Tg. of copolymer e-5: 77° C. | |
| Copolymer f-5: | |
| Monomer composition | |
| Styrene | 40.0 |
| Butyl methacrylate | 30.0 |
| Polymerization initiator | |
| Benzoyl peroxide | 2.0 |
| Tg. of copolymer f-5: 71° C. | |
| Copolymer g-5: | |

-continued

| Monomer composition | Parts |
|---|---|
| Monomer 1 | 40.0 |
| Styrene | 44.0 |
| Butyl acrylate | 16.0 |
| Polymerization initiator | |
| Azobisisobutyronitrile | 1.0 |
| 2,2'-Azobis(2,4-dimethyl-valeronitrile) | 1.3 |
| Tg. of copolymer g-5: 76° C. | |
| Copolymer h-5: | |
| Monomer composition | |
| Monomer B-1 | 15.0 |
| Styrene | 80.0 |
| Dibutyl fumalate | 5.0 |
| Polymerization initiator | |
| Azobisisobutyronitrile | 1.0 |
| 2,2'-Azobis(2,4-dimethyl-valeronitrile) | 1.5 |
| Tg. of copolymer h-5: 70° C. | |
| Copolymer i-5: | |
| Monomer composition | |
| Monomer B-1 | 15.0 |
| Styrene | 67.0 |
| Butyl acrylate | 10.0 |
| Dibutyl fumalate | 8.0 |
| Polymerization initiator | |
| Azobisisobutyronitrile | 1.5 |
| 2,2'-Azobis(2,4-dimethyl-valeronitrile) | 2.0 |
| Tg. of copolymer i-5: 49° C. | |

(2) Production of toners

Materials shown in Table 11 as a whole were premixed in a Henschel mixer, and then melt kneaded by using a biaxial kneader at 160° C. Then, the cooled kneaded materials were finely pulverized by using a pin mill and a jet mill, followed by classification by using a sieve to give toners having an average particle size of 10 to 15 μm.

In Table 11, the following materials were used under the trademarks shown in Table 11.
Epikote 1001: epoxy resin (Shell Chemical Co.)
Oil Black BY: oil black (Orient Chemical Industries, Ltd.)
Cyanine Blue KRN: cyanine pigment (Sanyo Color Works, Ltd.)
Grass Green Pigment HK-2: pigment (Dainichiseika Clour & Chemicals Manufacturing Co., Ltd.)
Viscol 550P: olefin polymer (Sanyo Chemical Industries Co., Ltd.)
Popko 739: olefin polymer (Noda Wax Co., Ltd.)

TABLE 11

| | | Example | | | | Comp. Example | Example | Comparative Example | | |
|---|---|---|---|---|---|---|---|---|---|---|
| | | 46 | 47 | 48 | 49 | 7 | 50 | 8 | 9 | 10 |
| Binder resin | Copolymer a-5 | 95 | | | | | | | | |
| | Copolymer b-5 | | 91 | | | | | | | |
| | Copolymer c-5 | | | 66 | | | | | | |
| | Copolymer d-5 | | | 28 | 17 | | | | | |
| | Copolymer e-5 | | | | 70 | | | | | |
| | Copolymer f-5 | | | | | 84 | | 89 | | |
| | Copolymer g-5 | | | | | | 91 | | | |
| | Copolymer h-5 | | | | | | | | 95 | |
| | Copolymer i-5 | | | | | | | | | 92 |
| | Epikote 1001 | | | 2 | | | | | | |
| Positive charge imparting agent | | | | | | | | | | |
| Oil Black BY | | | | | | 5 | 3 | | | |
| Color-ant | Cyanine Blue-KRN | | 4 | | | | 4 | | | |
| | Grass Green pigment HK-2 | 3 | 4 | | | | | | 3 | 5 |
| | Carbon black #44 | | | | 10 | 8 | | 8 | | |
| Offset prevention agent | | | | | | | | | | |
| Viscol 550P | | 2 | 2 | | | 3 | 2 | 3 | 2 | |
| Popko 739 | | | | 3 | 3 | | | | | 3 |

(3) Production of Developers and Tests

Developers were produced by mixing 3 parts of a toner and 97 parts of iron oxide powder having an apparent density of 3.5 to 4.5 g/cm$^3$ and a particle size of 44 to 177 μm in an amount of 90% or more.

A selective drum rotating at a peripheral speed of about 30 cm/sec under circumstances of 20° to 30° C. and a humidity of 60 to 80% RH was positively charged uniformly with a corona voltage of +6 KV, subjected to writing of information by a He-Ne laser, followed by reverse development by a magnetic brushing method using a developer mentioned above. Then, the fixing was carried out by using a Teflon heat roll.

The printed letter density and fogging density were measured at the initial time and after printing 200,000 sheets of paper using a microphotometer MPM type (mfd. by Union Chemical Co., Ltd.).

Effects of environmental conditions were examined by changing the environmental conditions to 10° to 15° C. and 40 to 50% RH and measuring the initial printed letter density by conducting the reverse development in the same manner as mentioned above.

The fixing strength was obtained by adhering an adhesive tape to the fixed printed letters, peeling the tape off and calculating the following equation:

$$\text{Fixing strength (\%)} = \frac{\text{Printed letter density after peeling tape}}{\text{Printed letter density before peeling tape}} \times 100$$

Defects of printed letters by plasticized PVC were measured by sandwiching a printed product between sheets of plasticized PVC containing 30% of dioctyl phthalate at 40° C. under a load of 100 gf/cm$^2$ for 300 hours.

The results are shown in Table 12.

TABLE 12

|  |  | Example | | | | Comp. Example | Example | Comparative Example | | |
|---|---|---|---|---|---|---|---|---|---|---|
|  |  | 46 | 47 | 48 | 49 | 7 | 50 | 8 | 9 | 10 |
| Initial time | Printed letter density | 1.3 | 1.1 | 1.1 | 1.1 | 1.3 | 1.2 | * | 1.1 | 1.1 |
|  | Fogging | 0.07 | 0.07 | 0.07 | 0.07 | 0.07 | 0.07 | — | 0.07 | 0.1 |
| After printing 20000 sheets | Printed letter density | 1.2 | 1.1 | 1.2 | 1.0 | 0.8 | 1.2 | — | 1.0 | — |
|  | Fogging density | 0.08 | 0.09 | 0.09 | 0.08 | 0.15 | 0.09 | — | 0.09 | — |
| Fixing strength (%) | | 89 | 93 | 95 | 98 | 50 | 55 | — | 53 | 95 |
| Defects of printed letters by plasticized PVC | | Good | Good | Good | Good | Bad | Good | — | Bad | Bad |
| Printed letter density at 10–15° C., 30–40% RH | | 1.3 | 1.2 | 1.1 | 1.1 | 1.3 | 1.2 | — | 0.7 | 0.5 |
| Blow-off charge amount (μc/g) | | +20 | +40 | +45 | +43 | +43 | +30 | −15 | +45 | +35 |
| Caking resistance (40° C., 66% RH, 18 hrs.) | | Good | Good | Good | Good | Good | Good | Good | Good | Good |

(Note)
*Since the blow-off charge amount was negative, no development was carried out.

EXAMPLES 51 TO 56, COMPARATIVE EXAMPLES 11 TO 13

(1) Synthesis of Copolymers

To a reactor containing 2000 parts of aqueous dispersion dissolving 3 parts of partially saponified polyvinyl alcohol (Denka Poval W-24, mfd. by Denki Kagaku Kogyo K.K.), 1000 parts of polymerizable monomers having a composition as shown in Table 13 were added and polymerized at 80° to 90° C. for 10 hours under a nitrogen stream. After cooling and filtering, the resulting solid was dried with hot air to give a copolymer.

The glass transition points of the obtained copolymers are shown in Table 13.

Developers were produced by mixing 3% of a toner and 97% of iron oxide powder carrier having an apparent density of 4 to 4.5 g/cm³, electrical resistance of $10^8$ to $10^9$ Ω, and a particle size of 44 to 177 μm in an amount of 90% or more.

A selenium drum rotating at a peripheral speed of about 30 cm/sec was positively charged uniformly with a corona voltage of +4 KV, subjected to writing of information by a He-Ne laser, followed by reverse development by a magnetic brushing method using a developer mentioned above. Then, the toner image carried on a recording paper was fixed by a Teflon roll with the surface temperature of 140°±5° C.

Then, toner evaluation tests were conducted and the

TABLE 13

| | | | Copolymer | | | | | | | |
|---|---|---|---|---|---|---|---|---|---|---|
| | | | a-6 | b-6 | c-6 | d-6 | e-6 | f-6 | g-6 | h-6 |
| Monomer composition (parts) | Imido group-containing addition polymerizable monomer | α-Phthalimidethyl methacrylate | 30.0 | 30.0 | 10.0 | 37.0 | 40.0 | | | |
| | | 2-Phthalimidethyl acrylate | | | | 20.0 | | | | |
| | | N—Phenylmaleimide | | | | 3.0 | | | | |
| | Unsaturated polybasic carboxylic acid ester | Dibutyl fumalate | 30.0 | 25.0 | 40.0 | 5.0 | | 10.0 | | |
| | | Dibutyl maleate | | | | 5.0 | | | | |
| | | Dioctyl fumalate | | | | 5.0 | | | | |
| | Other vinyl monomer | Styrene | 40.0 | 44.0 | 50.0 | 25.0 | 45.0 | 90.0 | 80.0 | 42.0 |
| | | Diethylaminoethyl methacrylate | | 1.0 | | | | | | |
| | | 2-Hydroxypropyl methacrylate | | | | | | | | 40.0 |
| | | Butyl acrylate | | | | | 15.0 | | 20.0 | 18.0 |
| Polymerization initiator | | 1,1-Bis(t-butylperoxy)-3,3,5-trimethylcyclohexane | | | 1.0 | | | | | |
| | | Benzoyl peroxide | 3.5 | | | 3.0 | 2.3 | 2.0 | 2.0 | 5.0 |
| | | 2,2'-Azobisisobutyronitrile | | 1.0 | | 3.0 | | | | |
| | | 2,2'-Azobis-(2,4-dimethylvaleronitrile | | 1.0 | | | | | | |
| Glass transition point of copolymer (°C.) | | | 68 | 74 | 55 | 70 | 75 | 72 | 73 | 59 |

(2) Production of Toners

Materials shown in Table 14 as a whole were dry mixed, and then melt kneaded at 160° C. in a biaxial kneader. Then, the cooled kneaded materials were finely pulverized by using a jet air to give toners having a particle size of 5 to 25 μm.

(3) Evaluation Method results were shown in Table 15.

The test methods are as follows.
(i) Printed letter density and fogging density
Measured by using a reflection densitometer TC-6DS type (mfd. by Tokyo Denshoku Co., Ltd.).
(ii) Fixing Properties A printed product was adhered with an adhesive tape, which was then peeled off and the fixing strength was calculated by using the following equation:

$$\text{Fixing strength (\%)} = \frac{\text{Printed letter density after peeling tape}}{\text{Printed letter density before peeling tape}} \times 100$$

(iii) Defects of printed letters by plasticized PVC

A printed product was adhered to a plasticized polyvinyl chloride sheet containing 30% of dioctyl phthalate at 40° C. under a pressure of 5 gf/cm² for 200 hours, followed by peeling of the printed product. The degree of defects of printed letters was judged by the following standard:

3: No defect of printed letters.
2: Partial defects of printed letters were admitted but possible to read the letters.
1: Defects of printed letters were too large to read the letters.

(iv) Caking resistance

A toner was allowed to stand at 50° C. and 91% RH for 18 hours and the presence of agglomerates was examined.

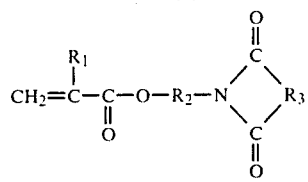

wherein $R_1$ is hydrogen or a methyl group; $R_2$ is an alkylene group having 1 to 6 carbon atoms or a divalent organic group having an alicyclic or aromatic ring; and $R_3$ is a group represented by the formula:

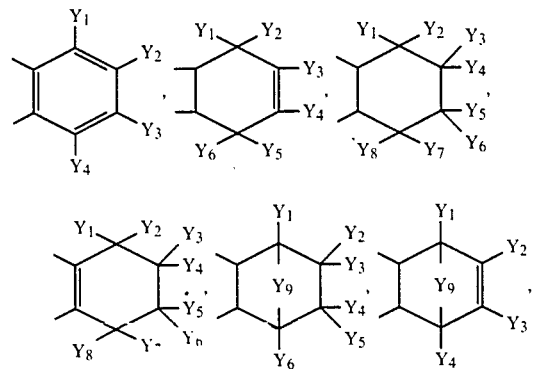

TABLE 14

| | | | Example | | | | | | Comparative Example | | |
|---|---|---|---|---|---|---|---|---|---|---|---|
| | | | 51 | 52 | 53 | 54 | 55 | 56 | 11 | 12 | 13 |
| Composition (%) | Copolymer | a-6 | 88.0 | | 80.0 | | 19.0 | | | | |
| | | a-6 | | 93.0 | | | 76.0 | | | | |
| | | c-6 | | | 8.5 | 8.0 | | | | | |
| | | d-6 | | | | 76.0 | | | | | |
| | | e-6 | | | | | | 88.0 | | | |
| | | f-6 | | | | | | | 88.0 | | |
| | | g-6 | | | | | | | | 88.0 | |
| | | h-6 | | | | | | | | | 88.0 |
| | Colorant | Carbon black #44 | 7.0 | 5.0 | 7.0 | 10.0 | | 7.0 | 7.0 | 7.0 | 7.0 |
| | | Cyanine Blue KRN | | | | | 4.0 | | | | |
| | Charge control agent | Oil Black BY | 3.0 | | 3.0 | 5.0 | | 3.0 | 3.0 | 3.0 | 3.0 |
| | Additive | Viscol 550P | 2.0 | 2.0 | 1.5 | 1.0 | 1.0 | 2.0 | 2.0 | 2.0 | 2.0 |

TABLE 15

| | | Example | | | | | | Comparative Example | | |
|---|---|---|---|---|---|---|---|---|---|---|
| | | 51 | 52 | 53 | 54 | 55 | 56 | 11 | 12 | 13 |
| Printed letter density | Initial time | 1.2 | 1.2 | 1.2 | 1.1 | 1.1 | 1.2 | 1.1 | 1.1 | 1.2 |
| | After printing 100,000 sheets | 1.1 | 1.1 | 1.1 | 1.0 | 1.0 | 1.1 | 1.0 | 1.0 | * |
| Fogging density | Initial time | 0.07 | 0.07 | 0.07 | 0.08 | 0.08 | 0.07 | 0.08 | 0.08 | 0.07 |
| | After printing 100,000 sheets | 0.09 | 0.09 | 0.09 | 0.09 | 0.09 | 0.09 | 0.09 | 0.09 | * |
| Fixing strength (%) | | 99 | 99 | 95 | 98 | 99 | 60 | 80 | 50 | 80 |
| Defects of printed letters by plasticized PVC | | 3 | 2 | 3 | 3 | 2 | 2 | 1 | 1 | 1 |
| Caking resistance | | O | O | O | O | O | O | O | O | X |

(Note)
*Filming took place on the drum after printing 20,000 sheets of paper and the printing was stopped.

What is claimed is:

1. A toner for developing latent electrostatic images comprising as a binder polymer a polymer having as an essential component a monomer unit derived from an imido group-containing unsaturated monomer represented by the formula:

-continued

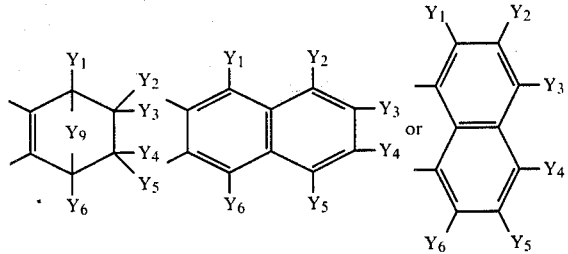

wherein $Y_1$, $Y_2$, $Y_3$, $Y_4$, $Y_5$, $Y_6$, $Y_7$, and $Y_8$ are independently hydrogen, an alkyl group having 1 to 3 carbon atoms, a halogen,

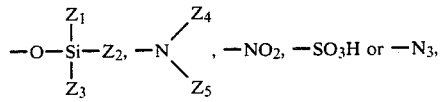

in which $Z_1$, $Z_2$, $Z_3$, $Z_4$ and $Z_5$ are independently hydrogen or an alkyl group having 1 to 5 carbon atoms; and $Y_9$ is

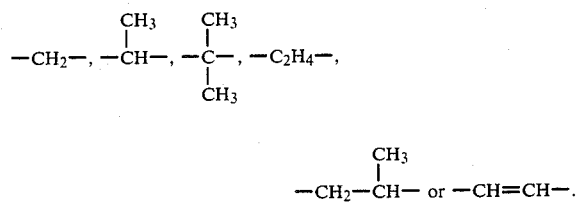

2. A toner according to claim 1, which further comprises one or more colorants and/or magnetic powders.

3. A toner according to claim 1, wherein the monomer unit derived from the imido group-containing unsaturated monomer of the formula (I) is present in an amount of 5% by weight or more based on the total weight of the binder polymer.

4. A toner according to claim 1, wherein the monomer unit derived from the imido group-containing unsaturated monomer of the formula (I) is present in an amount of 10 to 90% by weight based on the total weight of the binder polymer.

5. A toner according to claim 1, wherein the polymer is a copolymer of 5% by weight or more of the imido group-containing unsaturated monomer of the formula (1) and 0.05 to 20% by weight of a compound of the formula:

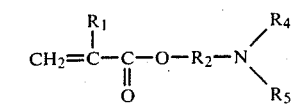

wherein $R_1$ is hydrogen or a methyl group; $R_2$ is an alkylene group having 1 to 6 carbon atoms or a divalent organic group having an alicyclic or aromatic ring; and $R_4$ and $R_5$ are independently an alkyl group having 1 to 6 carbon atoms, or a group of the formula:

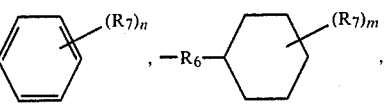

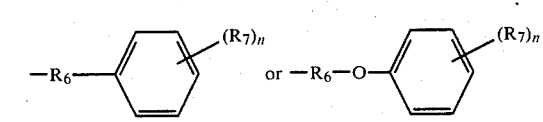

wherein $R_6$ is an alkylene group having 1 to 6 carbon atoms; $R_7$ is an alkyl group having 1 to 6 carbon atoms; n is zero or an integer of 1 to 5; and m is zero or an integer of 1 to 10, provided that the total number of carbon atoms of $R_2$, $R_4$ and $R_5$ is 4 or more, and when a ring is substituted with 2 or more $R_7$s, the $R_7$s may be the same or different.

6. A toner according to claim 1, wherein the polymer is a copolymer of 5% by weight or more of the imido group-containing unsaturated monomer of the formula (I) and 5 to 50% by weight of a compound of the formula:

wherein $R_8$, $R_9$, $R_{10}$ and $R_{11}$ are independently hydrogen, an alkyl group having 1 to 6 carbon atoms, a hydroxyl group,

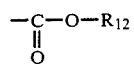

(in which $R_{12}$ is an alkyl group having 2 to 18 carbon atoms), or

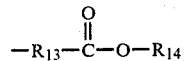

(in which $R_{13}$ is an alkylene group having 1 to 6 carbon atoms; and $R_{14}$ is an alkyl group having 2 to 18 carbon atoms), and at least two ester linkages are present in the molecule.

* * * * *